US011627264B2

(12) United States Patent
Igarashi et al.

(10) Patent No.: US 11,627,264 B2
(45) Date of Patent: Apr. 11, 2023

(54) PHOTOELECTRIC CONVERSION DEVICE, IMAGING SYSTEM, AND MOVABLE OBJECT

(71) Applicant: CANON KABUSHIKI KAISHA, Tokyo (JP)

(72) Inventors: Shinya Igarashi, Kawasaki (JP); Noriyuki Shikina, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/670,238

(22) Filed: Oct. 31, 2019

(65) Prior Publication Data

US 2020/0154067 A1    May 14, 2020

(30) Foreign Application Priority Data

Nov. 14, 2018  (JP) .............................. JP2018-213989

(51) Int. Cl.
*H04N 5/355* (2011.01)
*G06T 7/55* (2017.01)
(Continued)

(52) U.S. Cl.
CPC ........... *H04N 5/35554* (2013.01); *G06T 7/55* (2017.01); *H04N 5/363* (2013.01); *H04N 5/378* (2013.01);
(Continued)

(58) Field of Classification Search
CPC ...... H04N 5/378; H04N 5/374; H04N 5/3745; H04N 5/37457; H04N 5/3575;
(Continued)

(56) References Cited

U.S. PATENT DOCUMENTS 8,742,310 B2   6/2014  Guezzi
10,389,964 B2  8/2019  Taniguchi
(Continued)

FOREIGN PATENT DOCUMENTS

CN    101626461 A1    1/2010
CN    108513083 A     9/2018
(Continued)

OTHER PUBLICATIONS

European Search Report dated Jan. 16, 2020 in corresponding European application No. 19207570.3.
(Continued)

*Primary Examiner* — Farhan Mahmud
(74) *Attorney, Agent, or Firm* — Venable LLP

(57) ABSTRACT

A photoelectric conversion device includes a pixel unit having pixels arranged to form rows and columns, each including a transfer transistor that transfers charge in a photoelectric converter to an output unit, and a pixel control unit that controls the pixels. The pixel control unit is configured to supply a control signal in accordance with an exposure period individually defined for pixel blocks of the pixel unit to pixels of each pixel block and read out, from each pixel, a first signal obtained when the photoelectric converter is in a reset state and a second signal based on charge accumulated in the photoelectric converter during the exposure period. A period excluding both the exposure period and a readout period of the second signal corresponds to a reset period of the photoelectric converter. The transfer transistor is off in a readout period of the first and second signals.

37 Claims, 25 Drawing Sheets

(51) Int. Cl.
*H04N 5/369* (2011.01)
*H04N 5/363* (2011.01)
*H04N 5/378* (2011.01)

(52) U.S. Cl.
CPC ... *H04N 5/379* (2018.08); *G06T 2207/30252* (2013.01)

(58) Field of Classification Search
CPC .. H04N 5/335; H04N 5/37455; H04N 5/3765; H04N 5/363; H04N 9/045; H04N 5/3698; H04N 5/3741; H04N 9/04557; H04N 5/379; H04N 3/155; H01L 27/14609; H01L 27/14641; H01L 27/14612; H01L 27/14603
See application file for complete search history.

(56) References Cited

U.S. PATENT DOCUMENTS

| | | | |
|---|---|---|---|
| 2004/0096124 A1 | 5/2004 | Nakamura | |
| 2005/0151866 A1 | 7/2005 | Ando | |
| 2009/0002528 A1 | 1/2009 | Manabe | |
| 2010/0007780 A1* | 1/2010 | Nishihara | H04N 5/3535 348/311 |
| 2013/0107093 A1* | 5/2013 | Aoki | H04N 5/379 348/302 |
| 2013/0119233 A1 | 5/2013 | Guezzi | |
| 2016/0073016 A1 | 3/2016 | Ohya | |
| 2017/0257590 A1* | 9/2017 | Kato | H04N 5/378 |
| 2018/0007287 A1 | 1/2018 | Takenaka | |
| 2019/0082133 A1 | 3/2019 | Shikina | |

FOREIGN PATENT DOCUMENTS

| | | |
|---|---|---|
| JP | 2012-151847 | 8/2012 |
| JP | 2014-220644 A | 11/2014 |
| WO | 2018-012133 A1 | 1/2018 |

OTHER PUBLICATIONS

European Search Report dated Mar. 17, 2021 in corresponding European application No. 19207570.3.

Chinese Office Action dated Jul. 26, 2022 during prosecution of related Chinese application No. 201911092054.4 (English-language machine translation included.).

Japanese Office Action dated Nov. 17, 2022 during prosecution of related Japanese application No. 2018-213989 (English-language machine translation included.).

* cited by examiner

FIG. 11
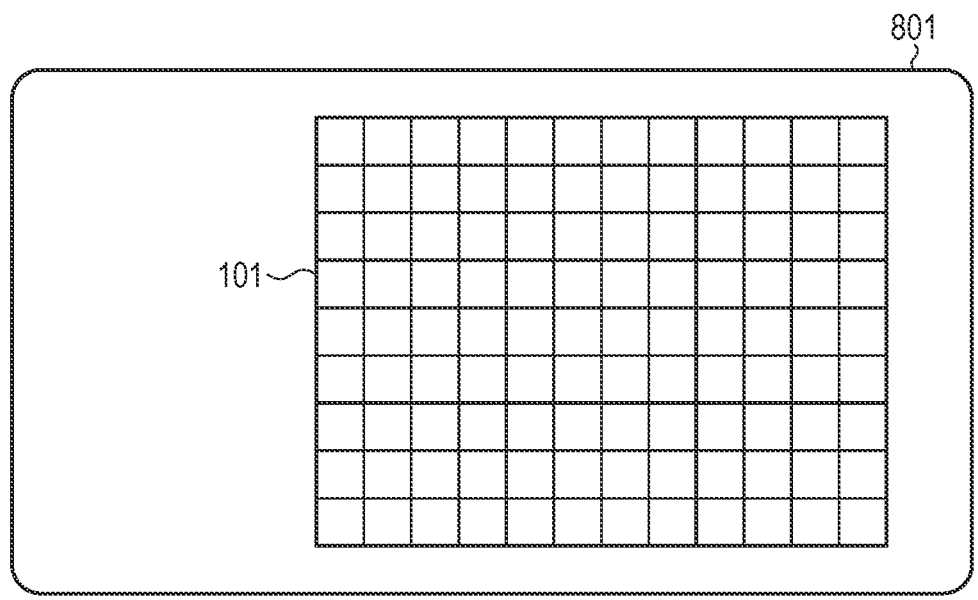
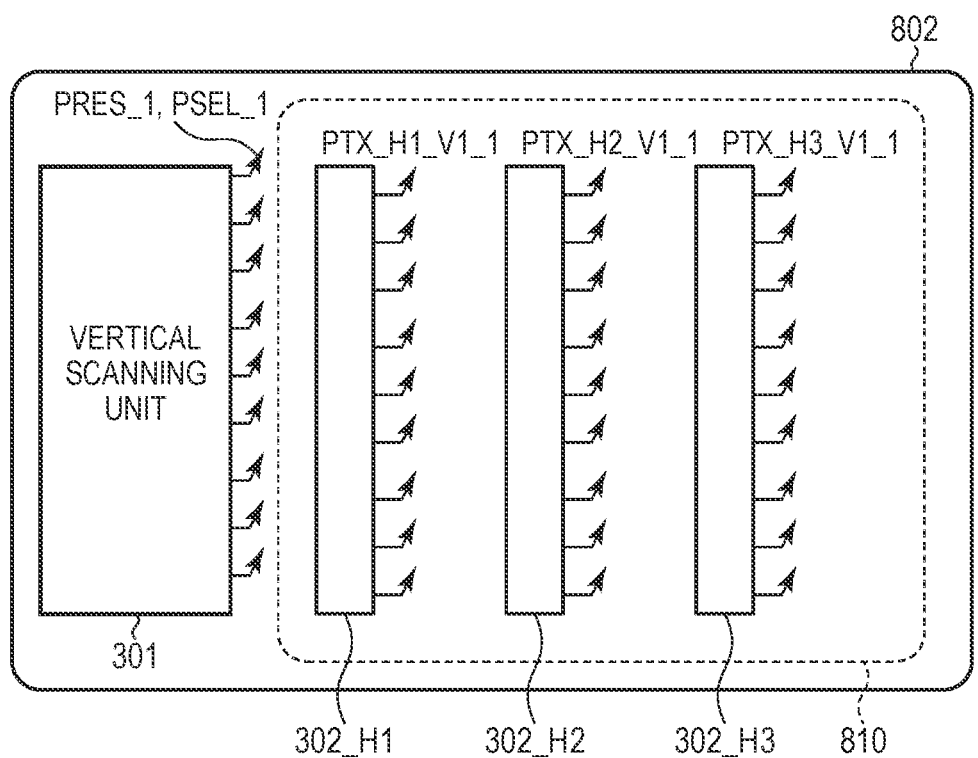

PHOTOELECTRIC CONVERSION DEVICE, IMAGING SYSTEM, AND MOVABLE OBJECT

BACKGROUND OF THE INVENTION

Field of the Invention

The present invention relates to a photoelectric conversion device, an imaging system, and a movable object.

Description of the Related Art

In a solid-state imaging device such as a CMOS image sensor, a technology to generate an image signal having a high dynamic range by composing two image signals obtained in different capturing conditions has been proposed. Japanese Patent Application Laid-Open No. 2012-151847 discloses a solid-state imaging device in which different exposure time can be set on a pixel block basis in order to acquire two image signals obtained in different capturing conditions. Further, Japanese Patent Application Laid-Open No. 2012-151847 discloses that a photoelectric converter is held in a reset state in a period other than the exposure period to prevent charge generated by the photoelectric converter in the period other than the exposure period from leaking out to an adjacent pixel and suppress image quality deterioration due to blooming.

In a solid-state imaging device, one of the widely used operations is to read out accumulated charge and read out noise, subtract a noise signal from a signal based on the accumulated charge, and thereby remove a noise component superimposed on the signal based on the accumulated charge. However, when the state of a transfer gate of a pixel circuit is different between at the time of readout of accumulated charge and at the time of readout of noise, this results in a large difference between a noise amount superimposed on accumulated charge and a read out noise amount. As a result, a noise component may not be appropriately removed from a signal based on accumulated charge, and image quality may deteriorate.

SUMMARY OF THE INVENTION

The object of the present invention is to provide a photoelectric conversion device and an imaging system in which different exposure time can be set on a pixel block basis and a noise component can be appropriately removed from a signal based on accumulated charge.

According to one aspect of the present invention, provided is a photoelectric conversion device including a pixel unit in which a plurality of pixels are arranged to form a plurality of rows and a plurality of columns and each of the plurality of pixels includes a photoelectric converter that generates charge by photoelectric conversion, an output unit that outputs a signal in accordance with an amount of charge, and a transfer transistor that transfers charge in the photoelectric converter to the output unit, and a pixel control unit that controls operations of the plurality of pixels, wherein the pixel unit includes a plurality of pixel blocks each including one or more of the pixels, wherein the pixel control unit includes select circuits respectively associated to the plurality of pixel blocks, each of the select circuit being configured to select a control signal to be supplied to the pixels of a corresponding pixel block, wherein the pixel control unit is configured to supply, to the pixels of each of the plurality of pixel blocks, a control signal in accordance with an exposure period individually defined for the plurality of pixel blocks, wherein the pixel control unit is configured to read out, from each of the plurality of pixels, a first signal obtained when the photoelectric converter is in a reset state and a second signal based on charge accumulated in the photoelectric converter during the exposure period, wherein a period excluding both the exposure period and a period in which the second signal is being read out corresponds to a reset period of the photoelectric converter in which the photoelectric converter is being in the reset state, and wherein the transfer transistor is in an off-state in a period in which the first signal is read out and a period in which the second signal is read out.

Further, according to another aspect of the present invention, provided is a photoelectric conversion device including a pixel unit in which a plurality of pixels are arranged to form a plurality of rows and a plurality of columns and each of the plurality of pixels includes a photoelectric converter that generates charge by photoelectric conversion, an output unit that outputs a signal in accordance with an amount of charge, and a transfer transistor that transfers charge in the photoelectric converter to the output unit; and a pixel control unit that controls operations of the plurality of pixels, wherein the pixel unit includes a plurality of pixel blocks each including one or more of the pixels, wherein the pixel control unit includes select circuits respectively associated to the plurality of pixel blocks, each of the select circuits being configured to select a control signal to be supplied to the pixels of a corresponding pixel block, wherein the pixel control unit is configured to supply, to the pixels of each of the plurality of pixel blocks, a control signal in accordance with an exposure period individually defined for the plurality of pixel blocks, wherein a period excluding both the exposure period and a period in which a signal based on charge accumulated in the photoelectric converter during the exposure period is being read out corresponds to a reset period of the photoelectric converter in which the photoelectric converter is being in the reset state, and wherein each of the select circuits includes at least two signal level holding units each configured to generate a control signal supplied to the transfer transistor of the pixels belonging to the corresponding pixel block.

Further features of the present invention will become apparent from the following description of exemplary embodiments with reference to the attached drawings.

BRIEF DESCRIPTION OF THE DRAWINGS

FIG. 11 is a block diagram illustrating a configuration example of a photoelectric conversion device according to a third embodiment of the present invention.

DESCRIPTION OF THE EMBODIMENTS

First Embodiment

A photoelectric conversion device and a method of driving the same according to a first embodiment of the present invention will be described with reference to FIG. 1 to FIG. 8.

Figure 1:
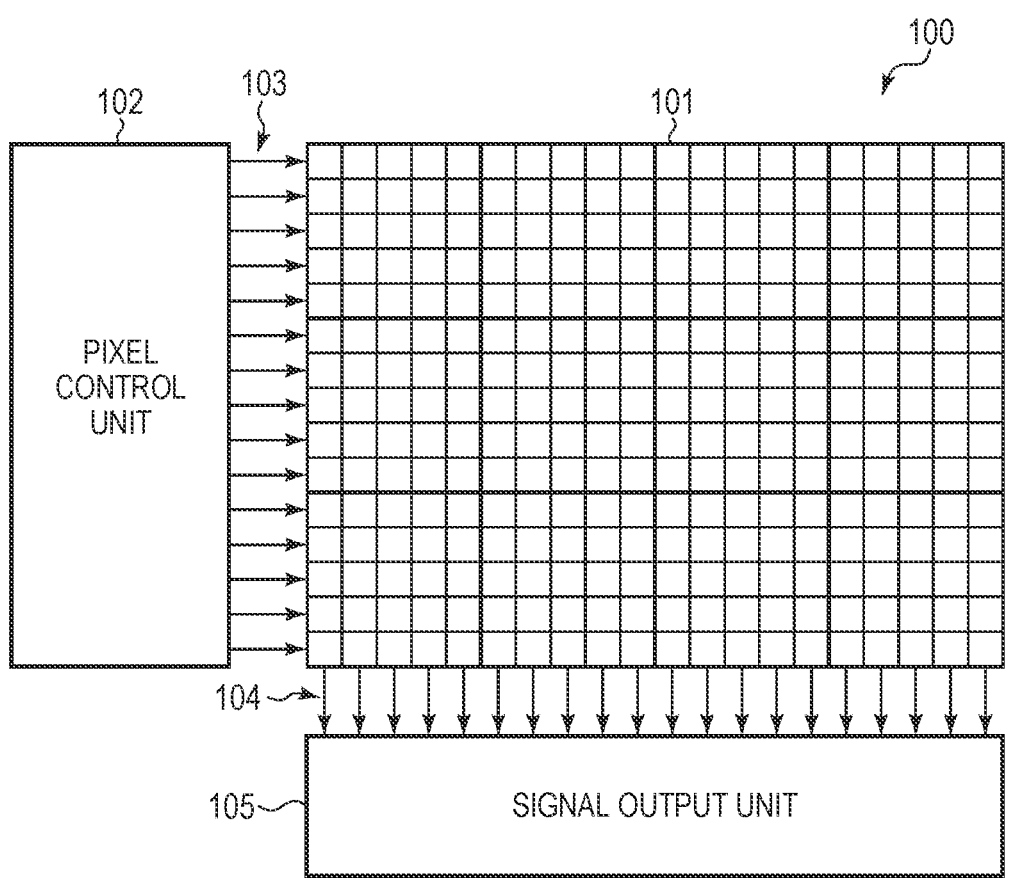
FIG. 1 is a block diagram illustrating a configuration example of a photoelectric conversion device according to a first embodiment of the present invention.
Figure 2:
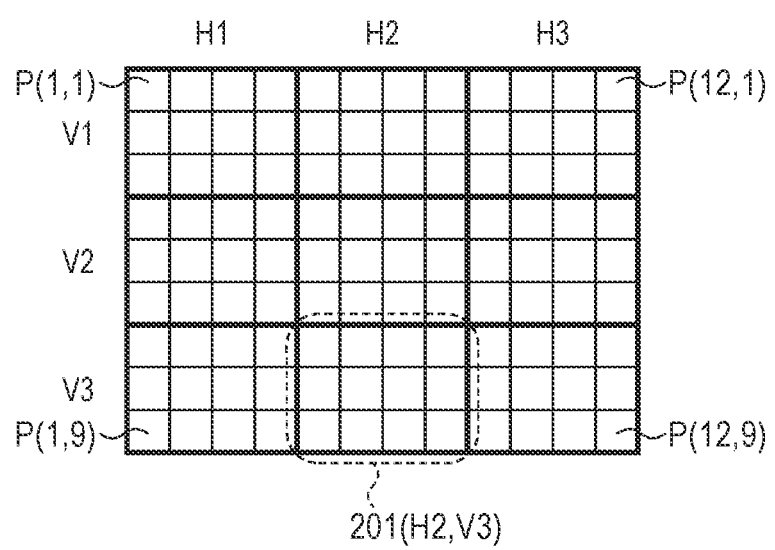
FIG. 2 is a schematic diagram illustrating a configuration example of a pixel unit in the photoelectric conversion device according to the first embodiment of the present invention.
Figure 3:
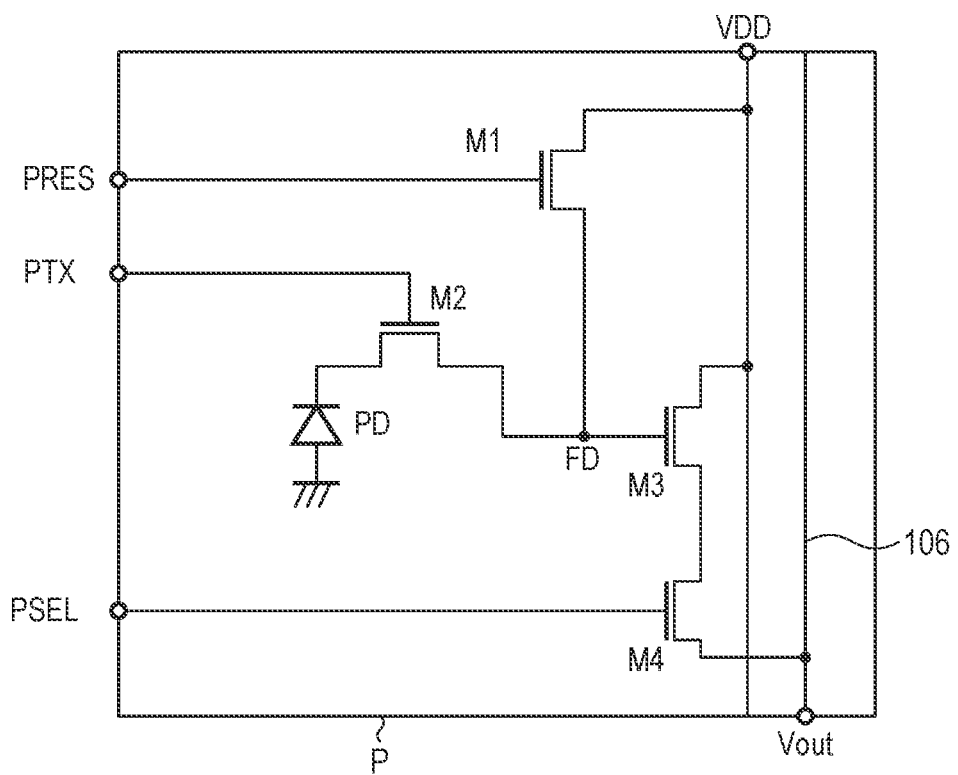
FIG. 3 is a circuit diagram illustrating a configuration example of a pixel in the photoelectric conversion device according to the first embodiment of the present invention.
Figure 4:
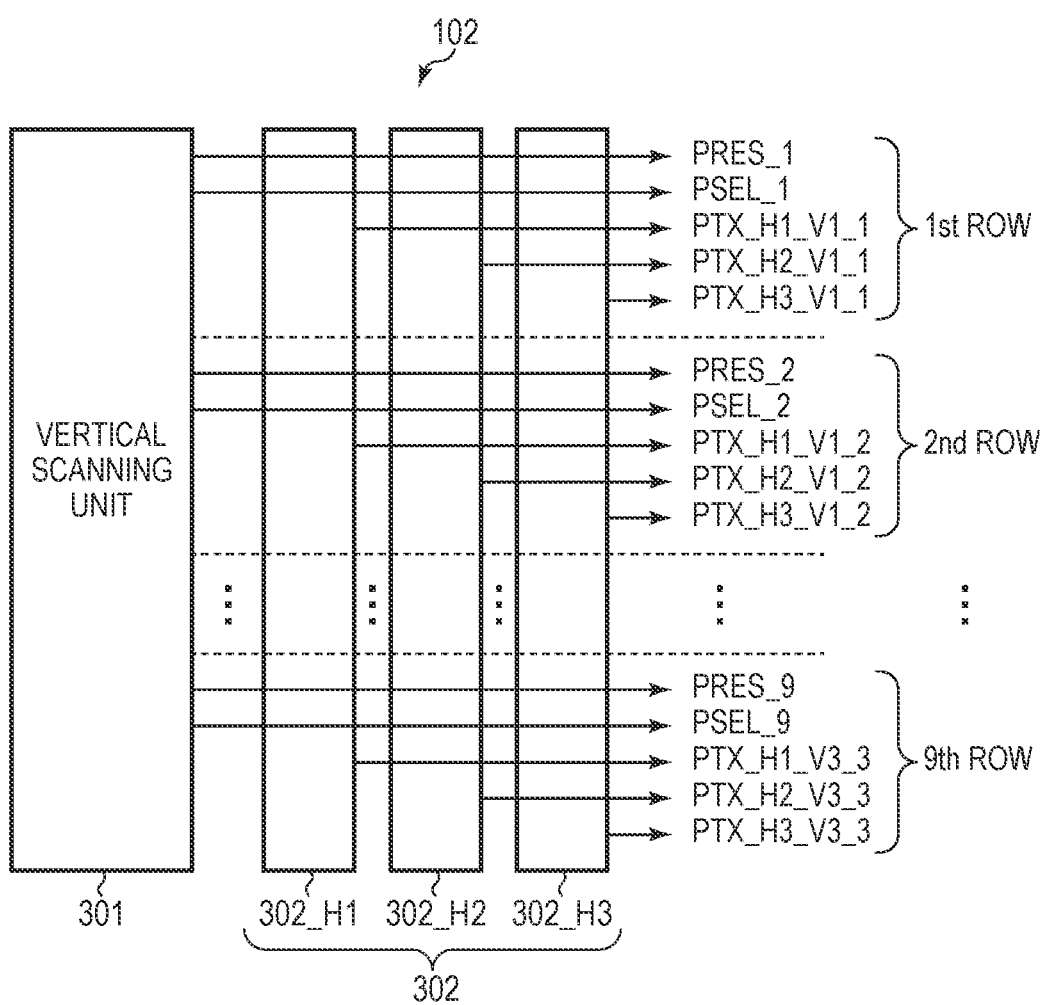
FIG. 4 is a block diagram illustrating a configuration example of a pixel control unit in the photoelectric conversion device according to the first embodiment of the present invention.

First, a general configuration of the photoelectric conversion device according to the present embodiment will be described by using FIG. 1 to FIG. 4. FIG. 1 is a block diagram illustrating a configuration example of a photoelectric conversion device according to the present embodiment. FIG. 2 is a schematic diagram illustrating a configuration example of a pixel unit in the photoelectric conversion device according to the present embodiment. FIG. 3 is a circuit diagram illustrating a configuration example of a pixel in the photoelectric conversion device according to the present embodiment. FIG. 4 is a block diagram illustrating a configuration example of a pixel control unit in the photoelectric conversion device according to the present embodiment.

As illustrated in FIG. 1, a photoelectric conversion device 100 according to the present embodiment includes a pixel unit 101, a pixel control unit 102, and a signal output unit 105. The pixel control unit 102 is connected to the pixel unit 101 via a pixel control line group 103 including a plurality of pixel control lines. The pixel unit 101 is connected to the signal output unit 105 via a pixel output line group 104 including a plurality of pixel output lines.

In the pixel unit 101, a plurality of pixels arranged in a matrix over a plurality of rows and a plurality of columns are provided. In FIG. 1, each of rectangular blocks depicted in the pixel unit 101 corresponds to one pixel. Note that, while FIG. 1 illustrates 300 pixels arranged on 15 rows by 20 columns, the number of pixels arranged in the pixel unit 101 is not particularly limited.

The pixel control unit 102 is a control circuit unit that controls the operation of pixels arranged in the pixel unit 101 by using control signals supplied to the pixel unit 101 via the pixel control line group 103. The pixel control line group 103 includes a plurality of pixel control lines corresponding to a plurality of rows of the pixel array forming the pixel unit 101. Typically, each of the pixel control lines includes a plurality of control lines. Each of the plurality of pixel control lines is connected to each of the pixels arranged on corresponding rows. Thereby, the pixel control unit 102 can control the operation of the pixels arranged in the pixel unit 101 on a row basis.

The pixel output line group 104 includes a plurality of pixel output lines corresponding to a plurality of columns of the pixel array forming the pixel unit 101. Each of the plurality of pixel output lines is connected to each of the pixels arranged on the corresponding columns. Thereby, it is possible to input signals read out from pixels on respective columns arranged on a row selected by the pixel control unit 102 to the signal output unit 105 via the pixel output line group 104.

The signal output unit 105 has a function of performing predetermined signal processing on a signal output from the pixel unit 101 and then externally outputting the processed signal. Signal processing performed by the signal output unit 105 is not particularly limited and may include, for example, an amplifying process or an analog-to-digital (AD) conversion process.

The pixel control unit 102 and the signal output unit 105 may be controlled by control signals supplied from a control unit (not illustrated) provided in the photoelectric conversion device 100 or the outside of the photoelectric conversion device 100.

As illustrated in FIG. 2, the pixel unit 101 may be formed of a plurality of pixel blocks 201 each including one pixel P or a plurality of pixels P. As an example, FIG. 2 illustrates the pixel unit 101 in which the pixel blocks 201 in which the pixels P are arranged in a matrix of 3 rows by 4 columns are arranged in a matrix of 3 rows by 3 columns. Note that the configuration example illustrated in FIG. 2 is for the purpose of simplified illustration, the pixel unit 101 and the pixel blocks 201 are not limited to the configuration illustrated in FIG. 2.

In the following description, a row in a unit of the pixel P may be referred to as a pixel row, a column in a unit of the pixel P may be referred to as a pixel column, a row in a unit of the pixel block 201 may be referred to as a pixel block row, and a column in a unit of the pixel block 201 may be referred to as a pixel block column. In the example of FIG. 2, it can be said that the pixel unit 101 is formed of the pixels P arranged in a matrix of 9 pixel rows by 12 pixel columns and formed of the pixel blocks 201 arranged in a matrix of 3 pixel block rows by 3 pixel block columns.

When the pixel P at a particular position in the pixel unit 101 is denoted, coordinates expressed by (column number, row number) are attached to the reference P of the pixel. For example, in FIG. 2, a pixel at the left upper corner is denoted by a reference P(1, 1), a pixel at the left under corner is denoted by a reference P(1, 9), a pixel at the right upper corner is denoted by a reference P(12, 1), and a pixel at the right under corner is denoted by a reference P(12, 9).

Further, when the pixel block 201 at a particular position in the pixel unit 101 is denoted, coordinates expressed by (column number, row number) are attached to the reference 201 of the pixel block. Note that "H" is attached to a column number of the pixel block 201 for distinction from a column number of the pixel P. Further, "V" is attached to a row number of the pixel block 201 for distinction from a row number of the pixel P. For example, in FIG. 2, the pixel block at the center on the under line is denoted by a reference 201(H2, V3).

As illustrated in FIG. 3, each of the pixels P includes a photoelectric converter PD, a reset transistor M1, a transfer transistor M2, an amplifier transistor M3, and a select transistor M4. The photoelectric converter PD is a photodiode, for example. The photodiode forming the photoelectric converter PD has the anode connected to a reference voltage node and the cathode connected to the source of the transfer transistor M2. The drain of the transfer transistor M2 is connected to the source of the reset transistor M1 and the gate of the amplifier transistor M3. The connection node of the drain of the transfer transistor M2, the source of the reset transistor M1, and gate of the amplifier transistor M3 is a so-called floating diffusion FD. The floating diffusion FD includes a capacitance component, functions as a charge holding portion, and forms a charge-to-voltage conversion unit made of this capacitance component. The drain of the reset transistor M1 and the drain of the amplifier transistor M3 are connected to a power supply voltage node (voltage VDD). The source of the amplifier transistor M3 is connected to the drain of the select transistor M4. The source of the select transistor M4 that is also the output node of the pixel P is connected to the pixel output line 106.

In the case of the pixel P illustrated in FIG. 3, a pixel control line on each row forming the pixel control line group 103 includes a signal line connected to the gate of the transfer transistor M2, a signal line connected to the gate of the reset transistor M1, and a signal line connected to the gate of the select transistor M4. The transfer transistor M2 is supplied with a control signal PTX from the pixel control unit 102 via a pixel control line on a corresponding row. The reset transistor M1 is supplied with a control signal PRES from the pixel control unit 102 via a pixel control line on a corresponding row. The select transistor M4 is supplied with a control signal PSEL from the pixel control unit 102 via a pixel control line on a corresponding row. The plurality of pixels P forming the pixel unit 101 are controlled on a row basis by the control signals PTX, PRES, and PSEL supplied from the pixel control unit 102. When each transistor of the pixel P is formed of an N-type transistor, a corresponding transistor is in an on-state when the control signal is at a High level (H level), and the corresponding transistor is in an off-state when the control signal is at a Low level (L level).

Once an optical image of an object enters the pixel unit 101, the photoelectric converter PD of each pixel P converts (photoelectrically converts) an incident light into an amount of charge in accordance with the light amount of the incident light and accumulates the generated charge. When turned on, the transfer transistor M2 transfers charge held by the photoelectric converter PD to the floating diffusion FD. The floating diffusion FD has a voltage in accordance with the amount of charge transferred from the photoelectric converter PD by charge-to-voltage conversion due to the capacitance component of the floating diffusion FD. The amplifier transistor M3 is configured such that the voltage VDD is supplied to the drain and a bias current is supplied to the source from a current source (not illustrated) via the select transistor M4 and forms an amplifier unit (a source follower circuit) whose gate is the input node. Thereby, the amplifier transistor M3 outputs a signal based on the voltage of the floating diffusion FD to the pixel output line 106 via the select transistor M4. When turned on, the reset transistor M1 resets the floating diffusion FD to a voltage in accordance with the voltage VDD.

As illustrated in FIG. 4, the pixel control unit 102 includes a vertical scanning unit 301 and a plurality of select circuit blocks 302 in accordance with each of the pixel block columns. For example, with respect to the pixel unit 101 illustrated in FIG. 2, the pixel control unit 102 includes three select circuit blocks 302_H1, 302_H2, and 302_H3 corresponding to the pixel block columns H1, H2, and H3, respectively.

The vertical scanning unit 301 outputs the common control signals PRES and PSEL to all the pixels P belonging to the same row. The select circuit block 302 outputs the common control signal PTX to the pixels P belonging to the same row on the corresponding pixel block column. That is, the select circuit block 302_H1 outputs the common control signal PTX to the pixels P belonging to the same row of the pixel block column H1. The select circuit block 302_H2 outputs the common control signal PTX to the pixels P belonging to the same row of the pixel block column H2. The select circuit block 302_H3 outputs the common control signal PTX to the pixels P belonging to the same row of the pixel block column H3.

FIG. 4 illustrates the control signals PTX, PRES, and PSEL output to the pixel unit 101 illustrated in FIG. 2, as an example. For example, control signals PRES_1 and PSEL_1 are output from the vertical scanning unit 301 to all the pixels P belonging to the first row. A common control signal PTX_H1_V1_1 is output from the select circuit block 302_H1 to the pixels P belonging to the pixel block column H1, that is, the pixel P(1, 1) to the pixel P(4, 1) out of the pixels P belonging to the first row. A common control signal PTX_H2_V1_1 is output from the select circuit block 302_H2 to the pixels P belonging to the pixel block column H2, that is, the pixel P(5, 1) to the pixel P(8, 1) out of the pixels P belonging to the first row. A common control signal PTX_H3_V1_1 is output from the select circuit block 302_H3 to the pixels P belonging to the pixel block column H3, that is, the pixel P(9, 1) to the pixel P(12, 1) out of the pixels P belonging to the first row. The same applies to the second row to the ninth row.

That is, control signals PRES_K and PSEL_K are output from the vertical scanning unit 301 to all the pixels P belonging to the N-th row on the M-th pixel block row VM. Here, K is expressed as K=M×N, where M is an integer denoting a row number of the pixel block row and N is an integer denoting a row number of a pixel row within the pixel block 201. That is, K corresponds to a row number on the pixel row within the pixel unit 101.

Further, a common control signal PTX_H1_VM_N is output from the select circuit block 302_H1 to the pixels P belonging to the pixel block column H1 out of the pixels P belonging to the N-th row in the M-th pixel block row VM. A common control signal PTX_H2_VM_N is output from the select circuit block 302_H2 to the pixels P belonging to the pixel block column H2 out of the pixels P belonging to the N-th row in the M-th pixel block row VM. A common control signal PTX_H3_VM_N is output from the select circuit block 302_H3 to the pixels P belonging to the pixel block column H3 out of the pixels P belonging to the N-th row in the M-th pixel block row VM.

By configuring the control signals PTX, PRES, and PSEL supplied from the pixel control unit 102 to the pixel unit 101 as described above, it is possible to control the operation of the pixels P on a pixel block 201 basis.

Next, a method of driving the photoelectric conversion device according to the present embodiment will be described by using FIG. 5 to FIG. 8.

Figure 5:
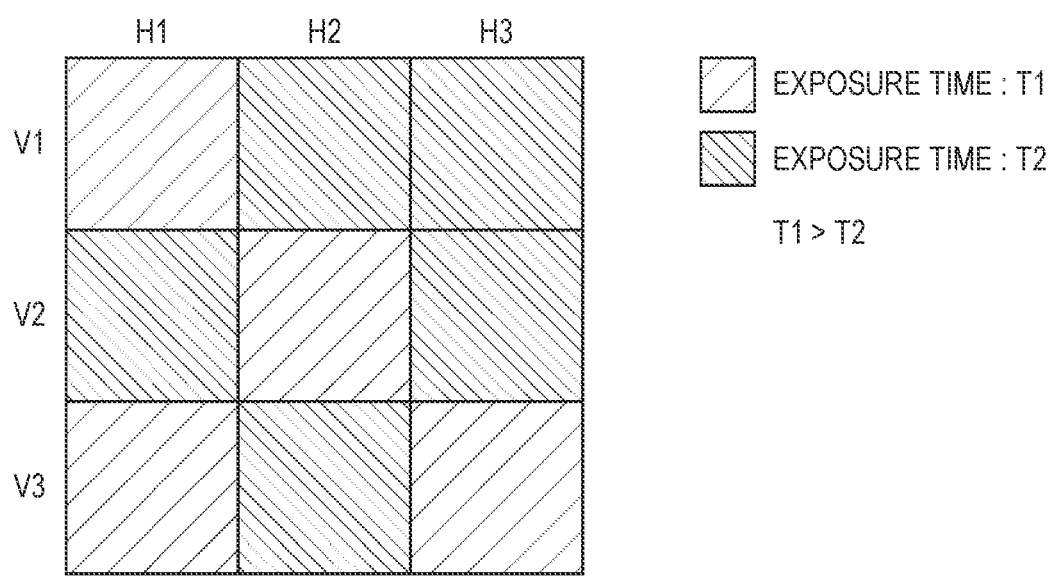
FIG. 5 is a schematic diagram illustrating a setting example of the length of an exposure period for each pixel block.

FIG. 5 is a schematic diagram when the lengths of the exposure time of the pixels P are set on a pixel block 201 basis. In the example of FIG. 5, the length of the exposure time of the pixels P belonging to the pixel blocks 201(H1, V1), 201(H2, V2), 201(H1, V3), and 201(H3, V3) is set to an exposure time T1. Further, the length of the exposure time of the pixels P belonging to the pixel blocks 201(H2, V1), 201(H3, V1), 201(H1, V2), 201(H3, V2), and 201(H2, V3) is set to an exposure time T2. Here, the exposure time T1 is relatively longer than the exposure time T2. In other words, the exposure time T2 is relatively shorter than the exposure time T1.

Note that, while the length of an exposure period is set to two types of the exposure time T1 and the exposure time T2 in the example of FIG. 5, the length of an exposure period may be set to three or more types of exposure time.

Figure 6A:
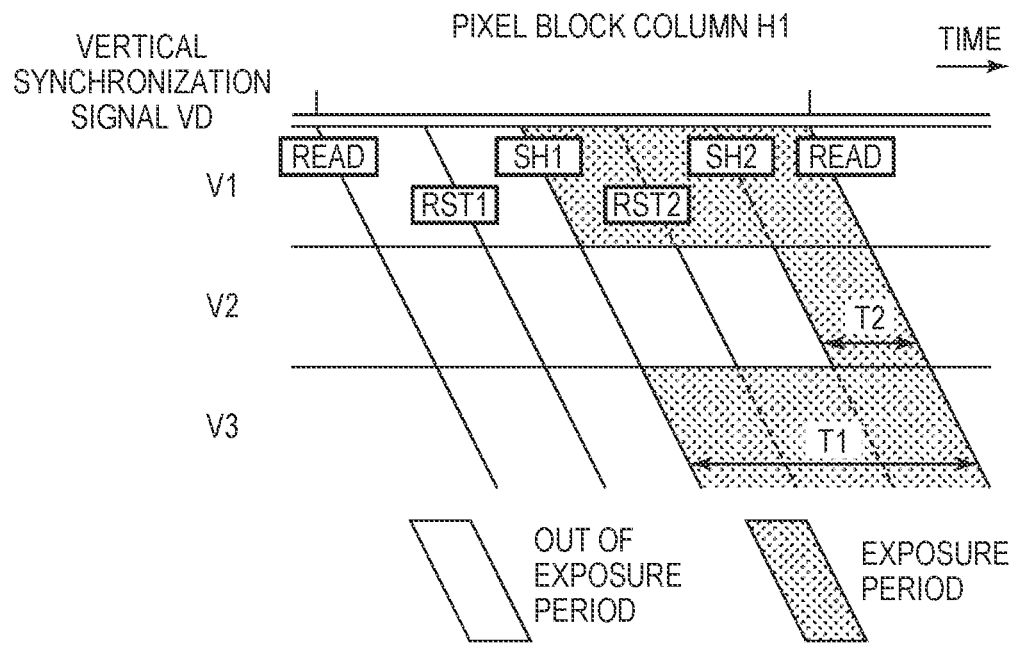
FIG. 6A and FIG. 6B are schematic diagrams illustrating a drive example of the photoelectric conversion device according to the first embodiment of the present invention.
Figure 6B:
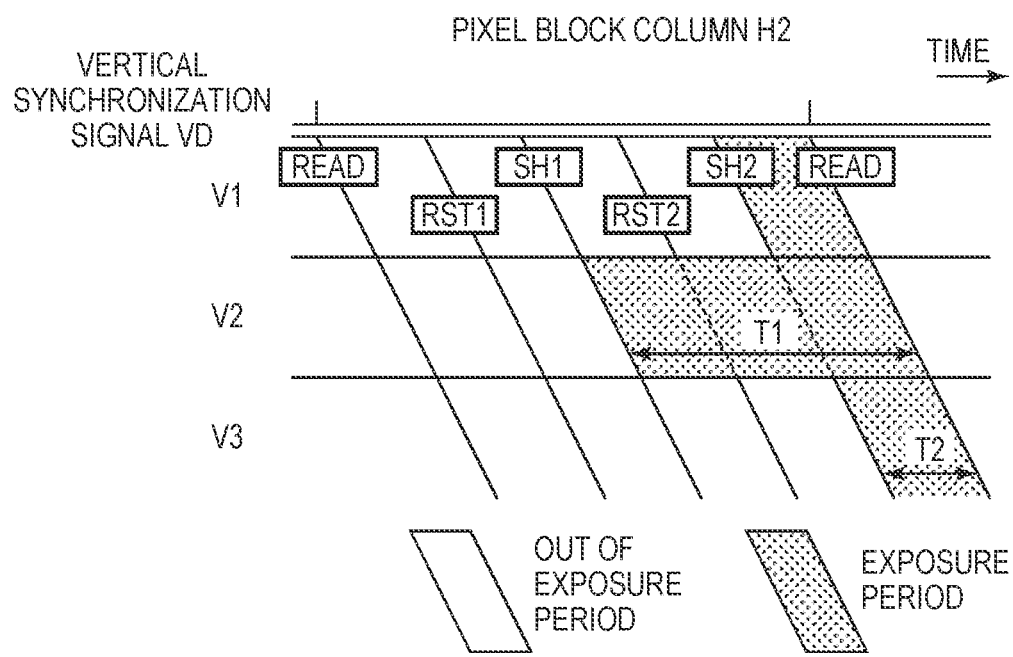

FIG. 6A and FIG. 6B are schematic diagrams illustrating a drive example for implementing the operation illustrated in FIG. 5. FIG. 6A illustrates a drive example on the pixel block column H1, and FIG. 6B illustrates a drive example on the pixel block column H2. In FIG. 6A and FIG. 6B, the horizontal axis represents time, and the vertical axis represents the pixel block row of the pixel unit 101. The vertical synchronization signal VD illustrates the start of one frame in capturing.

In FIG. 6A and FIG. 6B, the reference "READ" indicates an operation (a read operation) to read out a signal based on charge accumulated in the photoelectric converter PD of the pixel P. The references "SH1" and "SH2" indicate an operation (a shutter operation) to reset charge accumulated in the photoelectric converter PD of the pixel P. An SH-signal is input for multiple times at different timings in one frame, and different exposure time can be selected on a pixel block 201 basis by selection of enable/disable of the SH-signal on a pixel block 201 basis. In this example, two SH-signals of the operations "SH1" and "SH2" are assumed. Note that the selection of enable/disable is performed by controlling the control signal PTX output to each pixel P by the select circuit block 302.

A signal output from the pixel P is based on charge accumulated in the photoelectric converter PD during a period (an exposure period) from last input enabled "SH" to "READ". In the example of FIG. 6A, since the operation "SH1" is enabled and the operation "SH2" is disabled for the pixel blocks 201(H1, V1) and 201(H1, V3), the period from "SH1" to "READ" is the exposure period (the exposure time T1). Further, since the operation "SH2" is enabled and the operation "SH1" is disabled for the pixel block 201(H1, V2), the period from "SH2" to "READ" is the exposure period (the exposure time T2). In the example of FIG. 6B, since the operation "SH2" is enabled and the operation "SH1" is disabled for the pixel blocks 201(H2, V1) and 201(H2, V3), the period from "SH2" to "READ" is the exposure period (the exposure time T2). Further, since the operation "SH1" is enabled and the operation "SH2" is disabled for the pixel block 201(H2, V2), the period from "SH1" to "READ" is the exposure period (the exposure time T1).

Note that, while the number of times of shutter operations is two, namely, "SH1" and "SH2" in the example of FIG. 6A and FIG. 6B, a use of three or more times of shutter operations can increase the number of types of variation of exposure time to three or more.

The reference "RST" indicates an operation to reset charge accumulated in the photoelectric converter PD of the pixel P in a similar manner to the operation "SH". The references "RST1" and "RST2" correspond to the operation "RST" input at different timings. The difference between the operations "SH" and "RST" is the role thereof. While the operation "SH" has a role of resetting the photoelectric converter PD and starting accumulation of charge to the photoelectric converter PD, the operation "RST" has a role of resetting charge accumulated in the photoelectric converter PD of the pixel P in a period other than the exposure period. When the pixels P of different exposure periods are adjacent to each other, and if no operation "RST" is performed, charge accumulated in a period other than an exposure period may leak out of the photoelectric converter PD and leak into the adjacent pixel P that is in an exposure period. This phenomenon is called blooming and causes deterioration of image quality.

For example, in the example of FIG. 5 to FIG. 6B, the pixel P at the right end of the pixel block 201(H1, V2) and the pixel P on the left end of the pixel block 201(H2, V2) are adjacent pixels P having different exposure periods from each other. However, since the operation "RST" ("RST2") is performed in a period other than an exposure period on the pixel P of the pixel block 201(H1, V2) to prevent leakage of charge to the horizontal direction from the photoelectric converter PD, blooming can be suppressed. Further, leakage of charge to the vertical direction from the pixel P of the pixel block 201(H1, V2) to the pixel block 201(H1, V3) can also be prevented.

Figure 7:
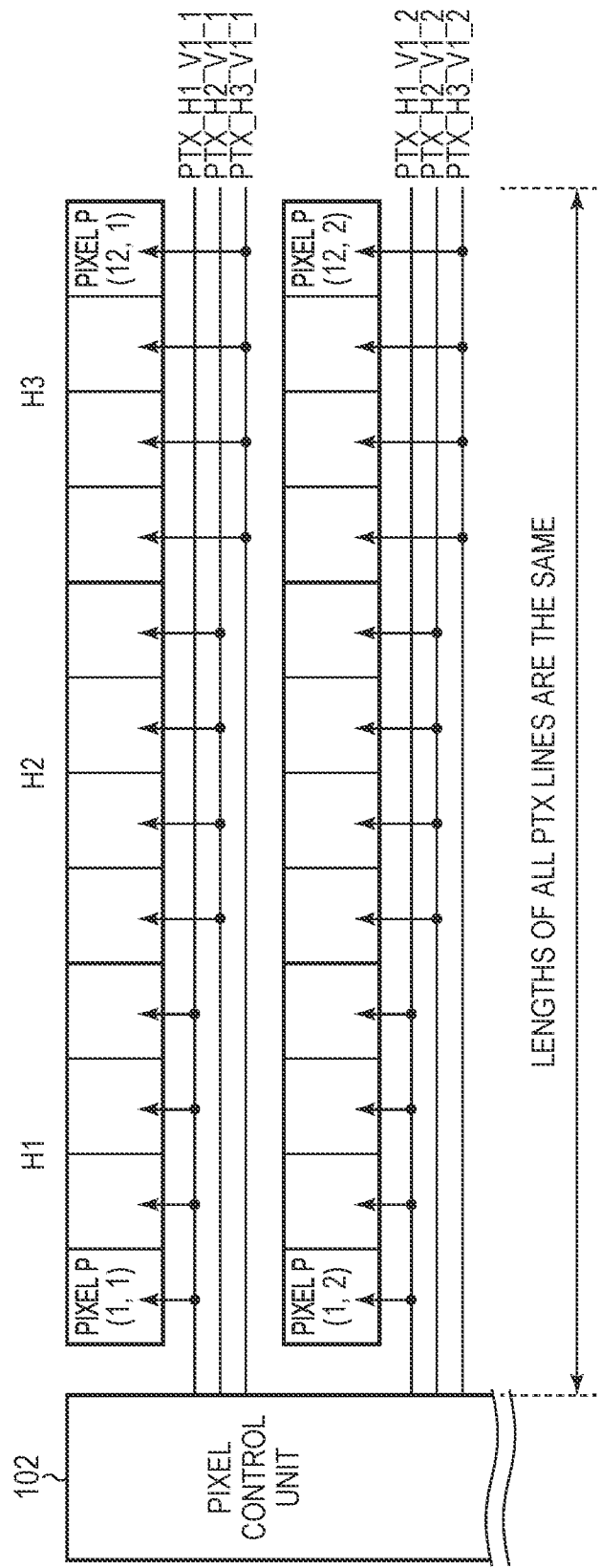
FIG. 7 is a block diagram illustrating a layout example of signal lines in the photoelectric conversion device according to the first embodiment of the present invention.

FIG. 7 is a block diagram illustrating a layout example of signal lines that supply the control signal PTX in the photoelectric conversion device according to the present embodiment. The number of signal lines that supply the control signal PTX per one pixel row is equal to the number of pixel blocks 201 present on the pixel row thereof. For example, in the example of the pixel unit 101 illustrated in FIG. 2, three signal lines that supply the control signal PTX are arranged on each pixel row. For example, a signal line that supplies a control signal PTX_H1_V1_1, a signal line that supplies a control signal PTX_H2_V1_1, and a signal line that supplies a control signal PTX_H3_V1_1 are arranged on the first pixel row. It is desirable that these signal lines have the same length so as to have the same parasitic capacitance. With such a configuration, variation of timings of the control signal PTX input to respective pixels P can be reduced.

Figure 8:
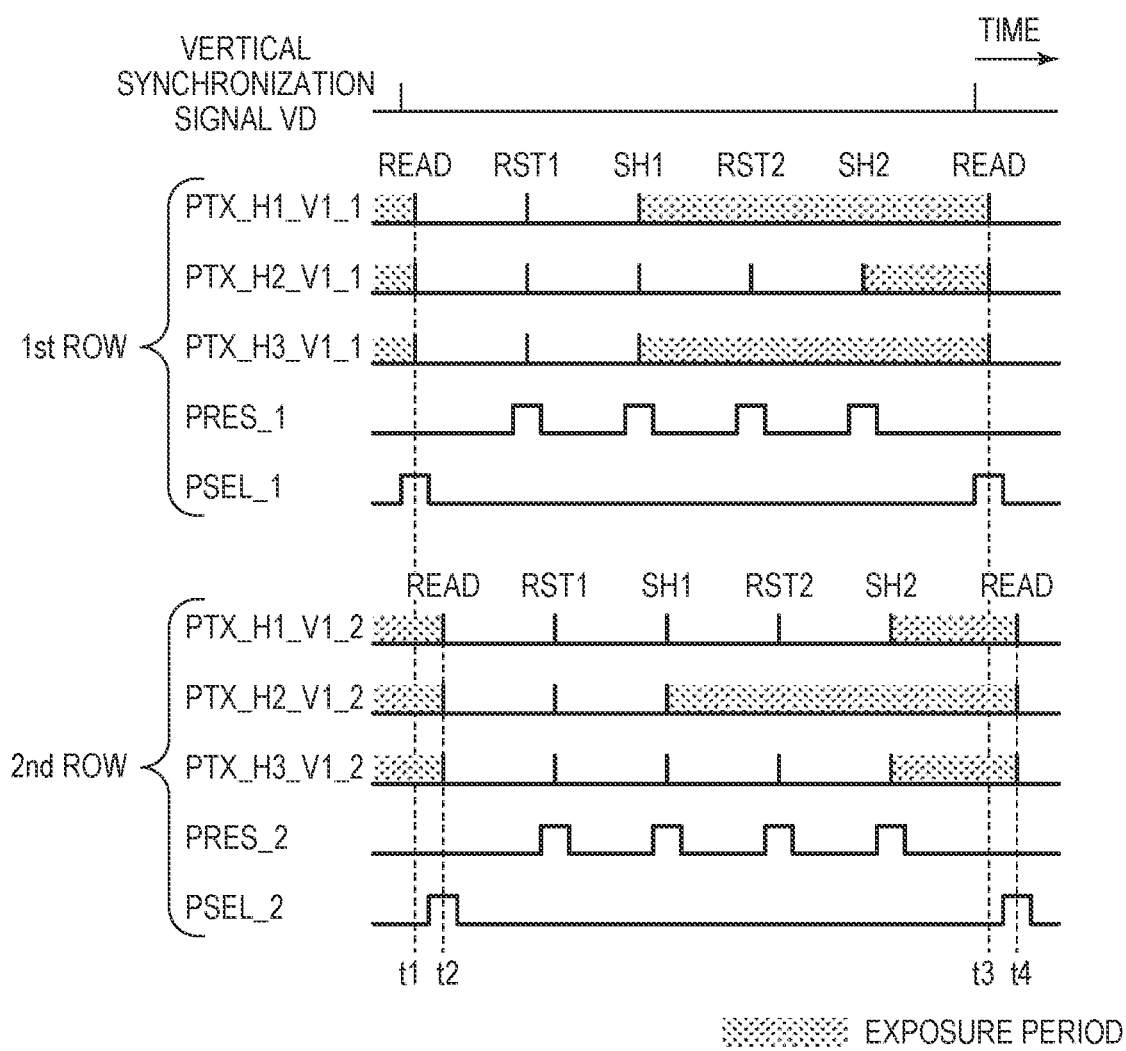
FIG. 8 is a timing diagram illustrating another drive example of the photoelectric conversion device according to the first embodiment of the present invention.

FIG. 8 is a timing diagram illustrating another drive example of the photoelectric conversion device according to the present embodiment. FIG. 8 illustrates timings of readout of charge from the photoelectric converter PD and reset thereof for the first and second pixel rows. In this drive example, on the first row and the second row, the exposure period is changed for the pixel block columns H1, H2, an H3. The operations "READ", "RST1", "SH1", "RST2", and "SH2" in FIG. 8 are the same as those of FIG. 6A and FIG. 6B.

Since charge accumulated in the photoelectric converter PD is transferred to the floating diffusion FD in response to transition of the control signal PTX to the H level, the control signal PTX is at the H level in each operation of "READ", "SH", and "RST". In the operation "READ", in response to control of the control signal PRES to the L level and the control signal PSEL to the H level, a signal based on charge accumulated in the photoelectric converter PD during an exposure period is read out. In the operations "SH" and "RST", in response to control of the control signal PRES to the H level and the control signal PSEL to the L level, charge accumulated in the photoelectric converter PD is reset.

When a single pixel row is focused on, the timing of "READ" in the pixel block columns H1, H2, and H3 are the same. The difference in the exposure period of the pixels P on a single pixel row occurs due to a difference in the timing when the operation "SH" is last supplied, that is, the timing when the photoelectric converter PD is last reset.

That is, on the first row, the operations "RST2" and "SH2" are disabled for the pixel block columns H1 and H3. Thereby, the exposure period on the pixel block columns H1 and H3 corresponds to the period from "SH1" to "READ", and the exposure period on the pixel block column H2 corresponds to the period from "SH2" to "READ".

Further, on the second row, the operations "RST2" and "SH2" are disabled for the pixel block column H2. Thereby, the exposure period on the pixel block column H2 corresponds to the period from "SH1" to "READ", and the exposure period on the pixel block columns H1 and H3 corresponds to the period from "SH2" to "READ".

While the timing of each operation is shifted by one horizontal period on the second row, the feature that the timings of "READ" on a single pixel row are the same is the same as on the first row. That is, in the drive example of FIG. 8, the timings of the first "READ" in respective pixels P on the first row are the same at time t1, and the timings of the first "READ" in respective pixels P on the second row are the same at time t2.

As described above, according to the present embodiment, it is possible to change the exposure period on a pixel block basis and expand the dynamic range of a captured image. Further, it is possible to suppress blooming and prevent deterioration of image quality by preventing leakage of charge to adjacent pixels in the column direction and the row direction. Further, with the same length of signal lines that supply the control signal PTX, the variation of timings of the PTX signals input to respective pixels P is reduced, the variation of charge accumulation periods is suppressed, and thereby deterioration of image quality can be prevented. Further, since a row scan of a rolling scheme can be applied by causing charge readout (READ) timings within one pixel row to be the same, this contributes to easy control.

Second Embodiment

Figure 9:
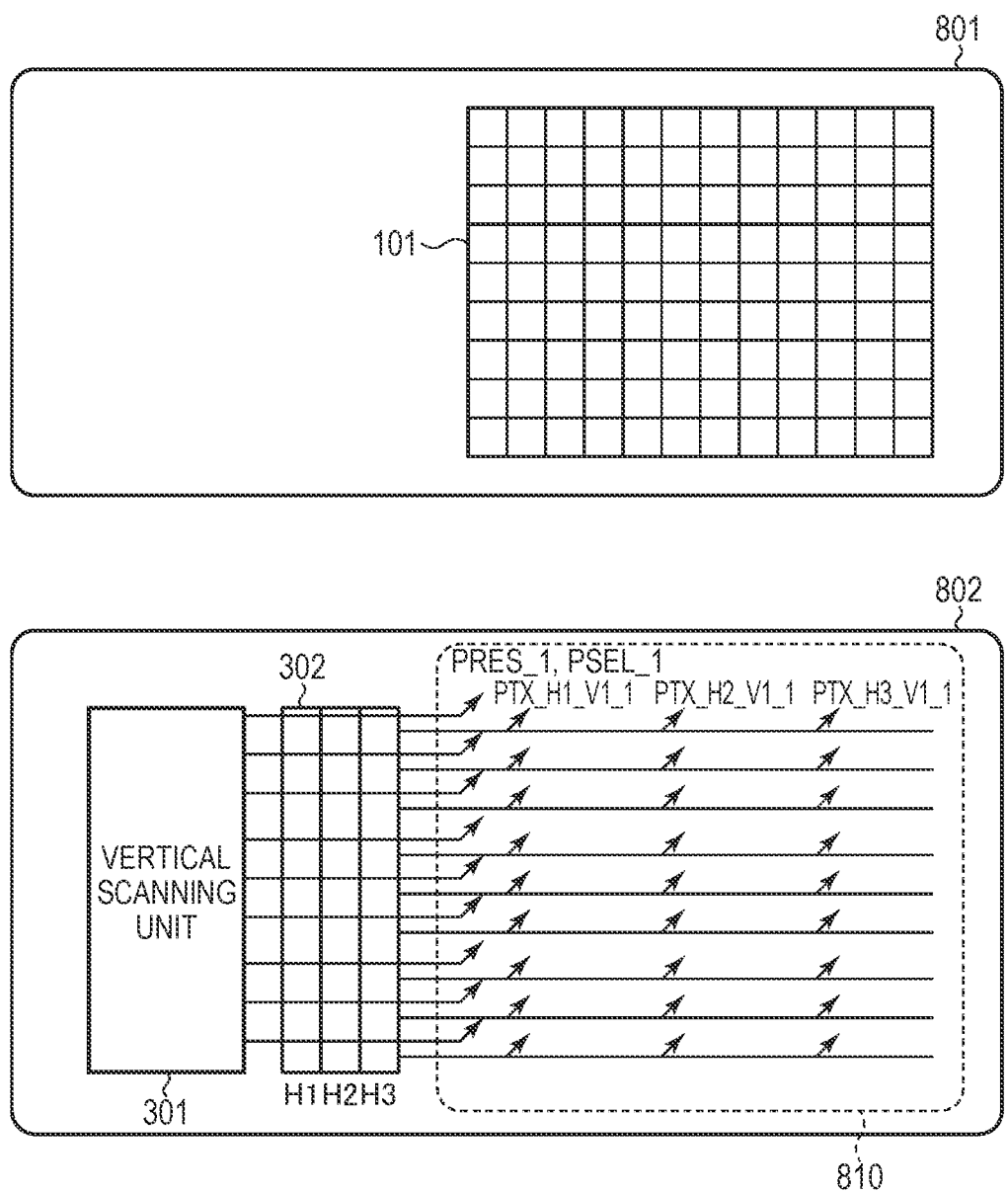
FIG. 9 is a block diagram illustrating a configuration example of a photoelectric conversion device according to a second embodiment of the present invention.
Figure 10:
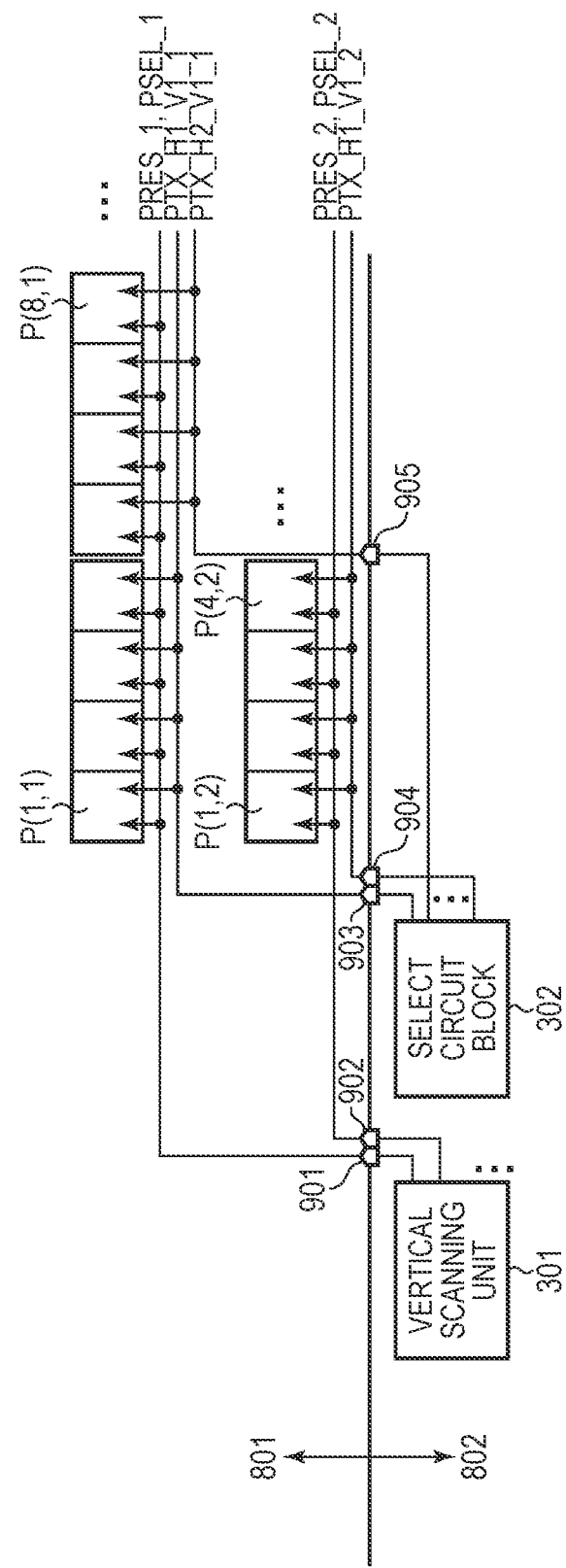
FIG. 10 is a block diagram illustrating an electrical connection relationship between substrates in the photoelectric conversion device according to the second embodiment of the present invention.

A photoelectric conversion device according to a second embodiment of the present invention will be described with reference to FIG. 9 and FIG. 10. The same components as those of the photoelectric conversion device according to the first embodiment are labeled with the same references, and the description thereof will be omitted or simplified. FIG. 9 is a block diagram illustrating a configuration example of the photoelectric conversion device according to the present embodiment. FIG. 10 is a block diagram illustrating an electrical connection relationship between substrates in the photoelectric conversion device according to the present embodiment.

As illustrated in FIG. 9, the photoelectric conversion device according to the present embodiment includes a first substrate 801 and a second substrate 802. At least the pixel unit 101 is provided on the first substrate 801. At least the select circuit block 302 is provided on the second substrate 802. In the configuration example illustrated in FIG. 9, the vertical scanning unit 301 and the select circuit block 302 are arranged on the second substrate 802 side. The first substrate 801 and the second substrate 802 are stacked to form a stacked-type photoelectric conversion device. Other features or operations are the same as those of the photoelectric conversion device according to the first embodiment.

In FIG. 10, a bold solid line is the boundary between the first substrate 801 and the second substrate 802. The upper part of this solid line illustrates the first substrate 801, and the lower part of this solid line illustrates the second substrate 802. In FIG. 10, to simplify the drawing, pixel P(1, 1) to pixel P(8, 1) on the first row and pixel P(1, 2) to pixel P(4, 2) on the second row are extracted from the pixel unit 101 and illustrated.

Control signals PRES_1 and PSEL_1 are input to pixel P(1, 1) to pixel P(8, 1). The control signals PRES_1 and PSEL_1 are generated by the vertical scanning unit 301 provided on the second substrate 802 and supplied from the second substrate 802 to the first substrate 801 through a connection node 901. The control signals PRES_1 and PSEL_1 are branched on the first substrate 801 into pixel P(1, 1) to pixel P(8, 1).

Similarly, control signals PRES_2 and PSEL_2 are input to pixel P(1, 2) to pixel P(4, 2). The control signals PRES_2 and PSEL_2 are generated by the vertical scanning unit 301 provided on the second substrate 802 and supplied from the second substrate 802 to the first substrate 801 through a connection node 902. The control signals PRES_2 and PSEL_2 are branched on the first substrate 801 into pixel P(1, 2) to pixel P(4, 2).

A control signal PTX_H1_V1_1 is input to pixel P(1, 1) to pixel P(4, 1). The control signal PTX_H1_V1_1 is generated by the select circuit block 302 provided on the second substrate 802 and supplied from the second substrate 802 to the first substrate 801 through a connection node 903. The control signal PTX_H1_V1_1 is connected to pixel P(1, 1) to pixel P(4, 1) by branch signal lines that are branched from a common signal line arranged on the first substrate 801.

Similarly, a control signal PTX_H2_V1_1 is input to pixel P(5, 1) to pixel P(8, 1). The control signal PTX_H2_V1_1 is generated by the select circuit block 302 provided on the second substrate 802 and supplied from the second substrate 802 to the first substrate 801 through a connection node 905. The control signal PTX_H2_V1_1 is connected to pixel P(5, 1) to pixel P(8, 1) by branch signal lines branched from a common signal line arranged on the first substrate 801.

Further, the control signal PTX_H1_V1_2 is input to pixel P(1, 2) to pixel P(4, 2). The control signal PTX_H1_V1_2 is generated by the select circuit block 302 provided on the second substrate 802 and supplied from the second substrate 802 to the first substrate 801 through the connection node 904. The control signal PTX_H1_V1_2 is connected to pixel P(1, 2) to pixel P(4, 2) by branch signal lines branched from a common signal line arranged on the first substrate 801.

In such a way, with the configuration in which control signals are branched on the first substrate 801, the number of electrical connection nodes between the first substrate 801 and the second substrate 802 can be reduced compared to a case where control signals are branched on the second substrate 802. This can reduce the probability of occurrence of a connection failure due to a manufacturing defect and suppress manufacturing variation. Therefore, the possibility that the value of parasitic capacitance or parasitic resistance of respective lines varies is reduced, and variation in timings of change of signals for respective pixels P can be reduced.

A plurality of connection nodes 901, a plurality of connection nodes 902, a plurality of connection nodes 903, a plurality of connection nodes 904, and a plurality of connection nodes 905 may be provided between the first substrate 801 and the second substrate 802, and respective lines may be arranged in parallel. Such a configuration can further reduce the occurrence probability of a connection failure.

As described above, according to the present embodiment, since the pixel unit 101 is arranged on the first substrate 801 and the vertical scanning unit 301 and the select circuit block 302 are arranged on the second substrate 802, the number of pixel control lines passing through the region of the pixel unit 101 can be reduced. Thereby, the area that can be used as a region of the pixels P can be expanded, and the photoelectric conversion efficiency of the pixels P can be increased.

Further, since a space occurs in a region 810 of the second substrate 802 right below the pixel unit 101 by providing the pixel unit 101 on the first substrate 801 side, it is possible to provide various function blocks by using the region 810. In the example illustrated in FIG. 9, the region in which the pixel unit 101 is provided and the region in which the select circuit blocks 302 are provided do not overlap each other in a plan view.

Further, since a connection failure between the first substrate 801 and the second substrate 802 can be reduced, variation in timings of control signals input to respective pixels P can be reduced, and deterioration of image quality can be suppressed.

Third Embodiment

A photoelectric conversion device according to a third embodiment of the present invention will be described with reference to FIG. 11. The same components as those of the photoelectric conversion device according to the first and second embodiments are labeled with the same references, and the description thereof will be omitted or simplified. FIG. 11 is a block diagram illustrating a configuration example of the photoelectric conversion device according to the present embodiment.

The photoelectric conversion device according to the present embodiment is the same as the photoelectric conversion device according to the second embodiment in that at least the pixel unit 101 is provided on the first substrate 801 and at least the select circuit block 302 is provided on the second substrate 802. The photoelectric conversion device according to the present embodiment is different from the second embodiment in that the select circuit block 302 provided on the second substrate 802 is provided in the region 810 of the second substrate 802 right below the pixel unit 101. Other features and operations are the same as those of the photoelectric conversion device according to the first and second embodiments.

That is, as illustrated in FIG. 11, the select circuit blocks 302_H1, 302_H2, and 302_H3 provided on the second substrate 802 are arranged in the region 810 right below the corresponding pixel block of the pixel unit 101 provided on the first substrate 801.

By arranging the select circuit block 302 in such a way, it is possible to reduce the area of the first substrate 801 and the second substrate 802 compared to the case of the second embodiment. Thereby, it is possible to reduce the size of the photoelectric conversion device while maintaining the photoelectric conversion efficiency of the pixels P.

Fourth Embodiment

A photoelectric conversion device and a method of driving the same according to a fourth embodiment of the present invention will be described with reference to FIG. 12A to FIG. 18. The same components as those of the photoelectric conversion device according to the first to third embodiments are labeled with the same references, and the description thereof will be omitted or simplified.

Figure 12A:
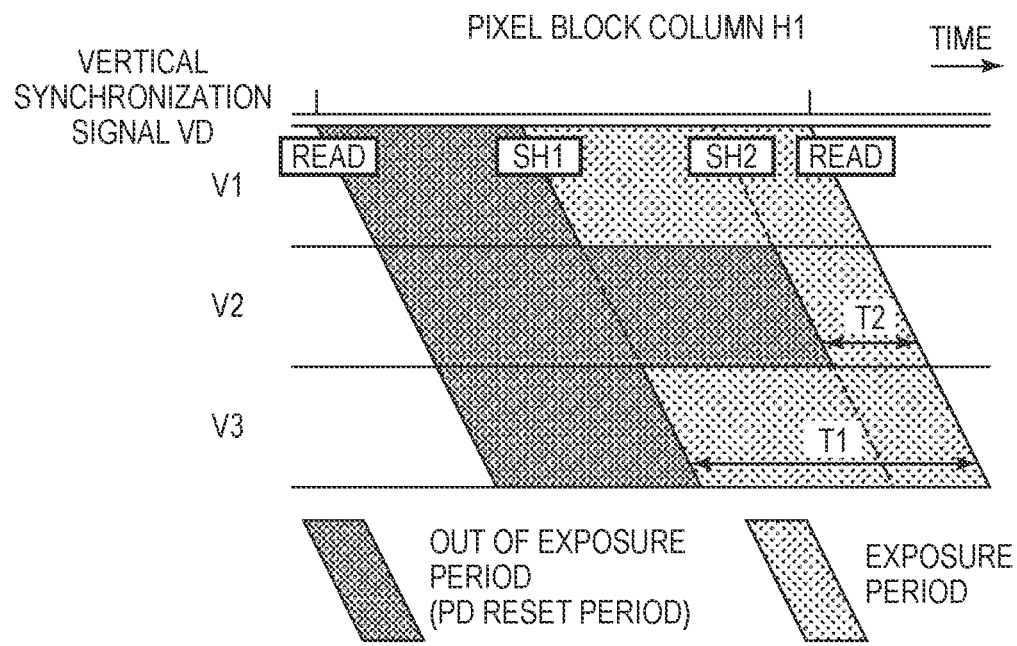
FIG. 12A and FIG. 12B are schematic diagrams illustrating a drive example of a photoelectric conversion device according to a fourth embodiment of the present invention.
Figure 12B:
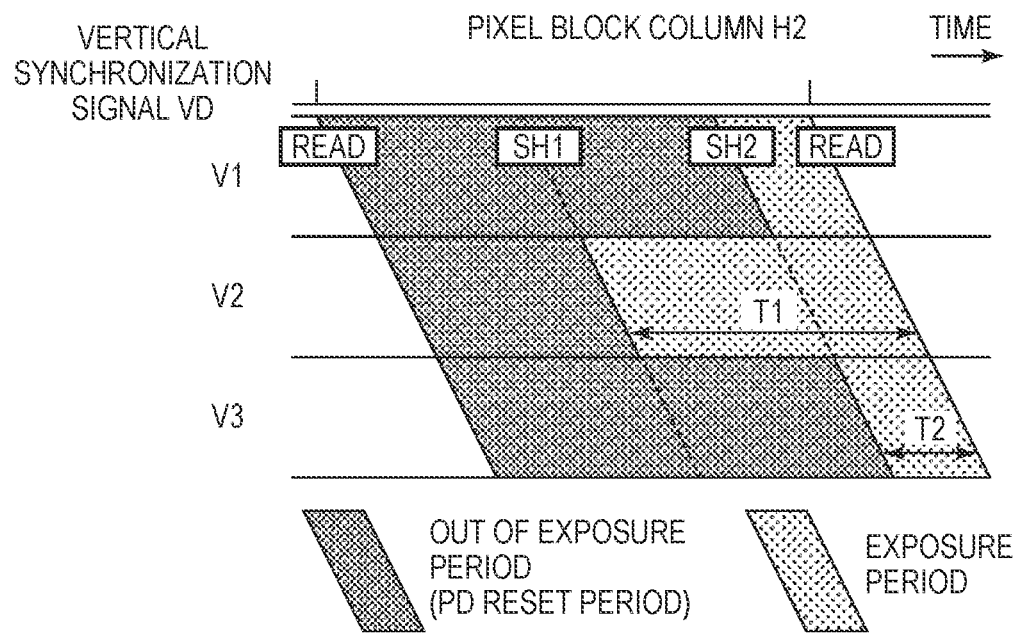

FIG. 12A and FIG. 12B are schematic diagrams illustrating drive examples of the photoelectric conversion device according to the present embodiment. FIG. 12A and FIG. 12B illustrate drive examples for implementing the operation illustrated in FIG. 5. FIG. 12A illustrates a drive example on the pixel block column H1, and FIG. 12B illustrates a drive example on the pixel block column H2. In FIG. 12A and FIG. 12B, the horizontal axis represents time, and the vertical axis represents pixel block rows of the pixel unit 101. The vertical synchronization signal VD is a signal indicating the start of one frame in capturing.

In FIG. 12A and FIG. 12B, the operations "READ", "SH1", and "SH2" are the same as those of FIG. 6A and FIG. 6B described in the first embodiment. That is, the reference "READ" indicates an operation (a read operation) to read out a signal based on charge accumulated in the photoelectric converter PD of the pixel P. The references "SH1" and "SH2" indicate an operation (a shutter operation) to reset charge accumulated in the photoelectric converter PD of the pixel P. An SH-signal is input for multiple times at different timings in one frame, and different exposure time can be selected on a pixel block 201 basis by selection of enable/disable of the SH-signal on a pixel block 201 basis. In this example, two SH-signals of the operations "SH1" and "SH2" are provided. Note that the selection of enable/disable is performed by controlling the control signal PTX output to each pixel P by the select circuit block 302.

The drive method of the present embodiment is different from the first to third embodiments in that there is no "RST" operation. Instead, in the present embodiment, a period from "READ" to the last enabled "SH" is set to a reset period in which the photoelectric converter PD is maintained in a reset state. The same features of any of the first to third embodiments can be applied to other features.

In the present drive example, since the operation "SH1" is enabled and the operation "SH2" is disabled for the pixel blocks 201(H1, V1) and 201(H1, V3), the period from "SH1" to "READ" is an exposure period. Since the operation "SH2" is enabled for the pixel block 201(H1, V2), the period from "SH2" to "READ" is an exposure period. In any of the pixel blocks 201, the photoelectric converter PD is maintained in a reset state in a period other than the exposure period. In other words, the role of the operation "READ" is to start reset of the photoelectric converter PD after readout of charge, and the role of the operation "SH" is to release reset of the photoelectric converter PD.

Note that, while the number of times of shutter operations is two, namely, "SH1" and "SH2" in this drive example, a use of three or more times of shutter operations can increase the number of types of variation of the exposure period to three or more.

In the present drive example, since the photoelectric converter PD is maintained in a reset state in a period other than the exposure period, there is a higher suppression effect against leakage of charge compared to the case where the operation "RST" is intermittently introduced as with the case of the first to third embodiments. That is, while there is a likelihood of leakage of charge out of the photoelectric converter PD when there is a high intensity incident light in a period from "RST" to "SH" in the first to third embodiments, there is no such likelihood in the present drive example. Further, while it is necessary to calculate the number of operations RST which is sufficient for suppressing leakage of charge as disclosed in the case of Japanese Patent Application Laid-Open No. 2012-151847 in the operation to intermittently introduce the operation "RST", such calculation is not necessary in the present drive example.

Figure 13:
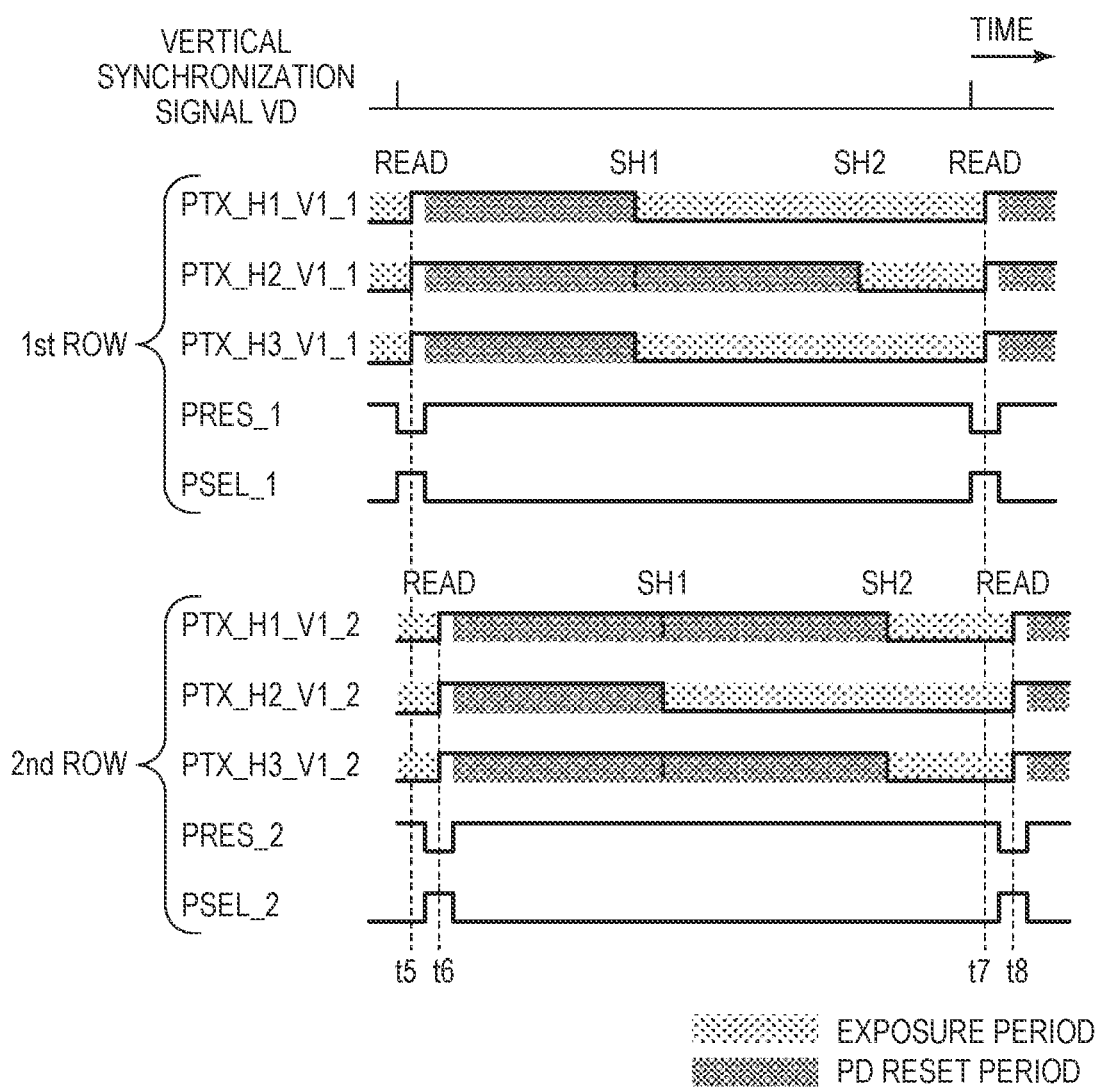
FIG. 13 is a timing diagram illustrating another drive example of the photoelectric conversion device according to the fourth embodiment of the present invention.

FIG. 13 is a timing diagram illustrating another drive example of the photoelectric conversion device according to the present embodiment. FIG. 13 illustrates timings of readout and reset of charge from the photoelectric converter PD for the first and second pixel rows. In this drive example, on the first row and the second row, the exposure period is changed for the pixel block columns H1, H2, an H3. The operations "READ", "SH1", and "SH2" in FIG. 13 are the same as those of FIG. 12A and FIG. 12B.

The period in which charge is accumulated in the photoelectric converter PD is a period in which the control signal PTX is at the L level, and the period in which the photoelectric converter PD is reset is a period in which the control signal PTX and the control signal PRES are at the H level. That is, in the operation of "READ", the control signal PTX is at the H level, the control signal PRES is at the L level, and the control signal PSEL is at the H level. Further, in the operation of "SH", the control signal PTX is at the L level, the control signal PRES is at the H level, and the control signal PSEL is at the L level.

When a single pixel row is focused on, the timing of "READ" in the pixel block columns H1, H2, and H3 are the same. The difference in the exposure period of the pixels P on a single pixel row occurs due to a difference in the timing when the operation "SH" is last supplied, that is, the timing when the photoelectric converter PD is last reset.

That is, on the first row, the operation "SH2" is disabled for the pixel block columns H1 and H3. Thereby, the exposure period on the pixel block columns H1 and H3 corresponds to the period from "SH1" to "READ", and the exposure period on the pixel block column H2 corresponds to the period from "SH2" to "READ".

Further, on the second row, the operation "SH2" is disabled for the pixel block column H2. Thereby, the exposure period on the pixel block column H2 corresponds to the period from "SH1" to "READ", and the exposure period on the pixel block columns H1 and H3 corresponds to the period from "SH2" to "READ".

While the timing of each operation is shifted by one horizontal period on the second row, the feature that the timings of "READ" on a single pixel row are the same is the same as on the first row. That is, in the drive example of FIG. 13, the timings of the first "READ" in respective pixels P on the first row are the same at time t5, and the timings of the first "READ" in respective pixels P on the second row are the same at time t6.

Figure 14:
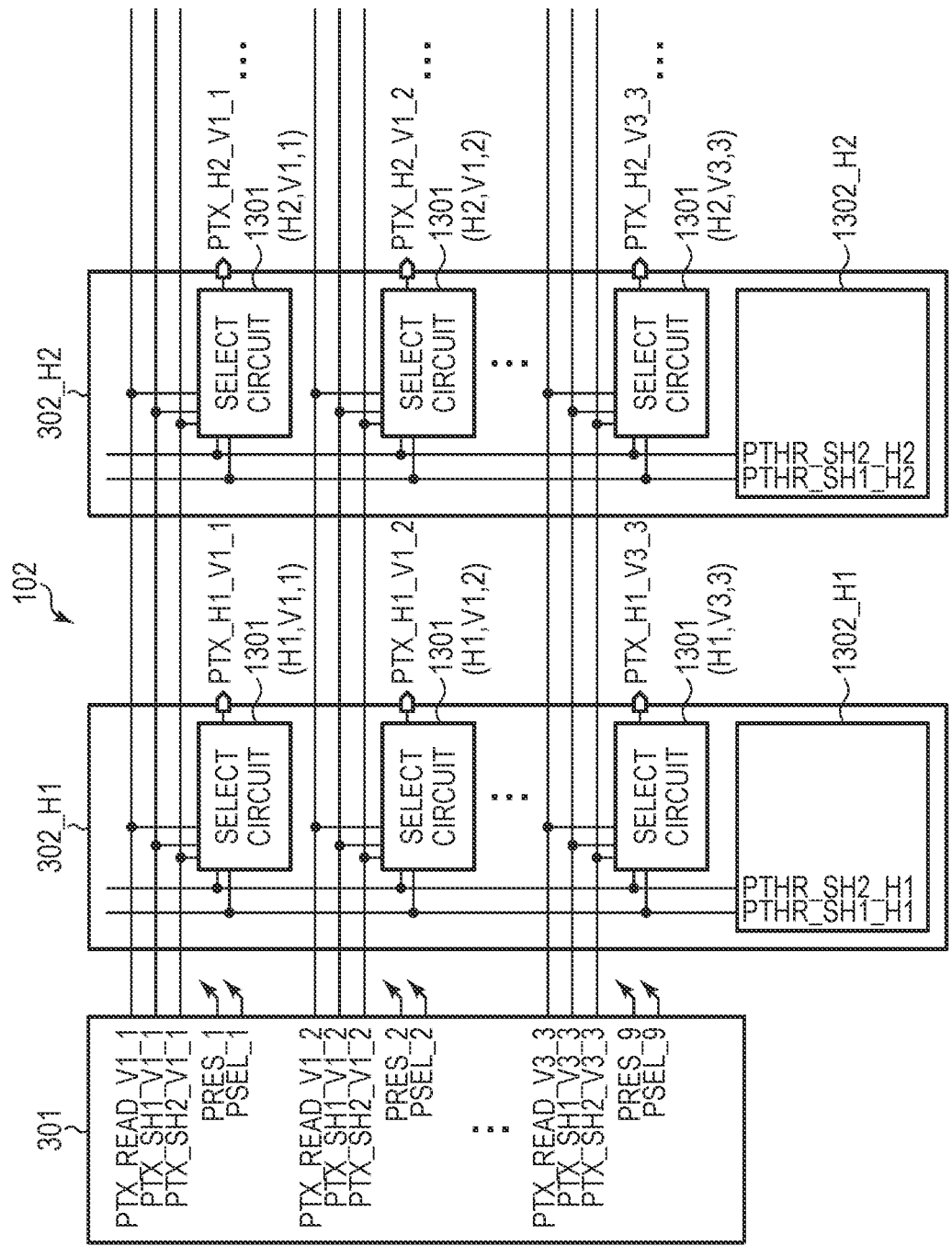
FIG. 14 is a block diagram illustrating a configuration example of a pixel control unit in the photoelectric conversion device according to the fourth embodiment of the present invention.

FIG. 14 is a block diagram illustrating the configuration example of the pixel control unit 102 in the photoelectric conversion device according to the present embodiment.

The pixel control unit 102 includes the vertical scanning unit 301 and the select circuit block 302, as described above. The select circuit block 302 is divided into a plurality of select circuit blocks 302_HL corresponding to pixel block columns of the pixel unit 101. Here, the reference L is an integer denoting a column number of the pixel block 201. Out of these multiple select circuit blocks 302_HL, FIG. 14 illustrates a select circuit block 302_H1 corresponding to the pixel block column H1 and a select circuit block 302_H2 corresponding to the pixel block column H2. Each of the select circuit blocks 302_H outputs the control signal PTX to the pixel block 201 on a corresponding pixel block column.

Each of the select circuit blocks 302 HL includes a plurality of select circuits 1301 corresponding to the number of pixel rows and a select control circuit 1302. A common control signal PTX as a control signal used for a shutter operation is input from the vertical scanning unit 301 to the select circuits 1301 arranged on the same pixel row.

For example, control signals PTX_READ_V1_1, PTX_SH1_V1_1, and PTX_SH2_V1_1 are input from the vertical scanning unit 301 to the select circuits 1301(H1, V1, 1) and 1301(H2, V1, 1) arranged on the first pixel row. Similarly, control signals PTX_READ_V1_2, PTX_SH1_V1_2, and PTX_SH2_V1_2 are input from the vertical scanning unit 301 to the select circuits 1301(H1, V1, 2) and 1301(H2, V1, 2) arranged on the second pixel row. Further, control signals PTX_READ_V3_3, PTX_SH1_V3_3, and PTX_SH2_V3_3 are input from the vertical scanning unit 301 to the select circuits 1301(H1, V3, 3) and 1301(H2, V3, 3) arranged on the ninth pixel row.

The operations of the select circuits 1301 provided on the same pixel row are distinguished by control signals supplied from the select control circuit 1302 provided on corresponding pixel block columns. For example, control signals PTHR_SH1_H1 and PTHR_SH2_H1 are input from the select control circuit 1302_H1 to the select circuits 1301 (H1, V1, 1), 1301(H1, V1, 2), and 1301(H1, V3, 3). Further, control signals PTHR_SH1_H2 and PTHR_SH2_H2 are input from the select control circuit 1302_H2 to the select circuits 1301(H2, V1, 1), 1301(H2, V1, 2), and 1301(H2, V3, 3).

That is, control signals PTX_READ_VM_N, PTX_SH1_VM_N, and PTX_SH2_VM_N are input from the vertical scanning unit 301 to the select circuit 1301 (HL, VM, N). Further, the control signals PTHR_SH1_HL and PTHR_SH2_HL are input from the select control circuit 1302_HL to the select circuit 1301 (HL, VM, N). Here, the reference L denotes a column number of the pixel block 201, the reference M denotes a row number of the pixel block 201, and the reference N is a row number of the pixel row within the pixel block 201.

Note that, in the present embodiment, two control signals, namely, the control signal PTHR_SH1_HL and the control signal PTHR_SH2_HL are supplied from the select control circuit 1302_HL to the select circuit 1301(HL, VM, N) in association with the operations "SH1" and "SH2". The number of control signals PTHR may be appropriately changed in accordance with the number of variations of the exposure period.

Figure 15:
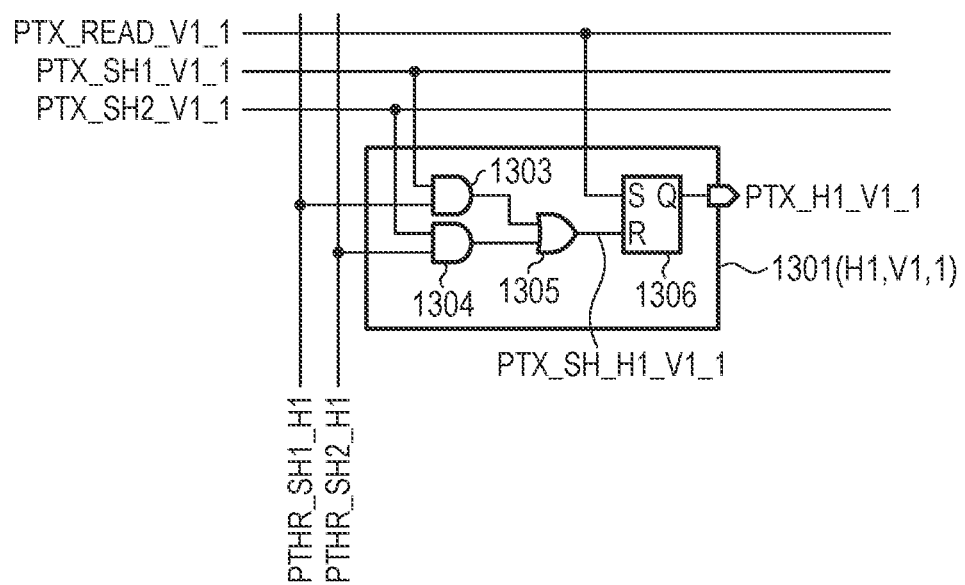
FIG. 15 is a block diagram illustrating a configuration example of a select circuit in the photoelectric conversion device according to the fourth embodiment of the present invention.

FIG. 15 illustrates a configuration example of the select circuit 1301(H1, V1, 1) as an example of the select circuit 1301(HL, VM, N).

The select circuit 1301(H1, V1, 1) includes an AND gate for SH1 1303, an AND gate for SH2 1304, an OR gate for SH 1305, and an S-R latch circuit 1306, for example. The S-R latch circuit 1306 is a latch circuit formed of an S-R (Set-Reset) flip-flop.

The control signal PTX_SH1_V1_1 and the control signal PTHR_SH1_H1 are input to the AND gate for SH1 1303. That is, the control signal PTX_SH1_V1_1 is output to the OR gate for SH 1305 on the post-stage only when the control signal PTHR_SH1_H1 is at the H level. Similarly, the control signal PTX_SH2_V1_1 and the control signal PTHR_SH2_H1 are input to the AND gate for SH2 1304. That is, the control signal PTX_SH2_V1_1 is output to the OR gate for SH 1305 on the post-stage only when the control signal PTHR SH2_H1 is at the H level. Note that selection of pass/not-pass of the control signals PTX_SH1_V1_1 and PTX_SH2_V1_1 corresponds to selection of enable/disable of the shutter operation.

The OR gate for SH 1305 outputs a control signal PTX_SH_H1_V1_1 in response to the output signal of the AND gate for SH1 1303 and the output signal of the AND gate for SH2 1304. The S-R latch circuit 1306 outputs a control signal PTX_H1_V1_1 from the output terminal (Q) in response to the input of the control signal PTX_READ_V1_1 to the set terminal (S) and the input of the control signal PTX_SH_H1_V1_1 to the reset terminal (R). This control signal PTX_H1_V1_1 is the output signal of the select circuit 1301(H1, V1, 1). The S-R latch circuit 1306 is used for holding a reset state and an exposure state of the photoelectric converter PD.

Figure 16:
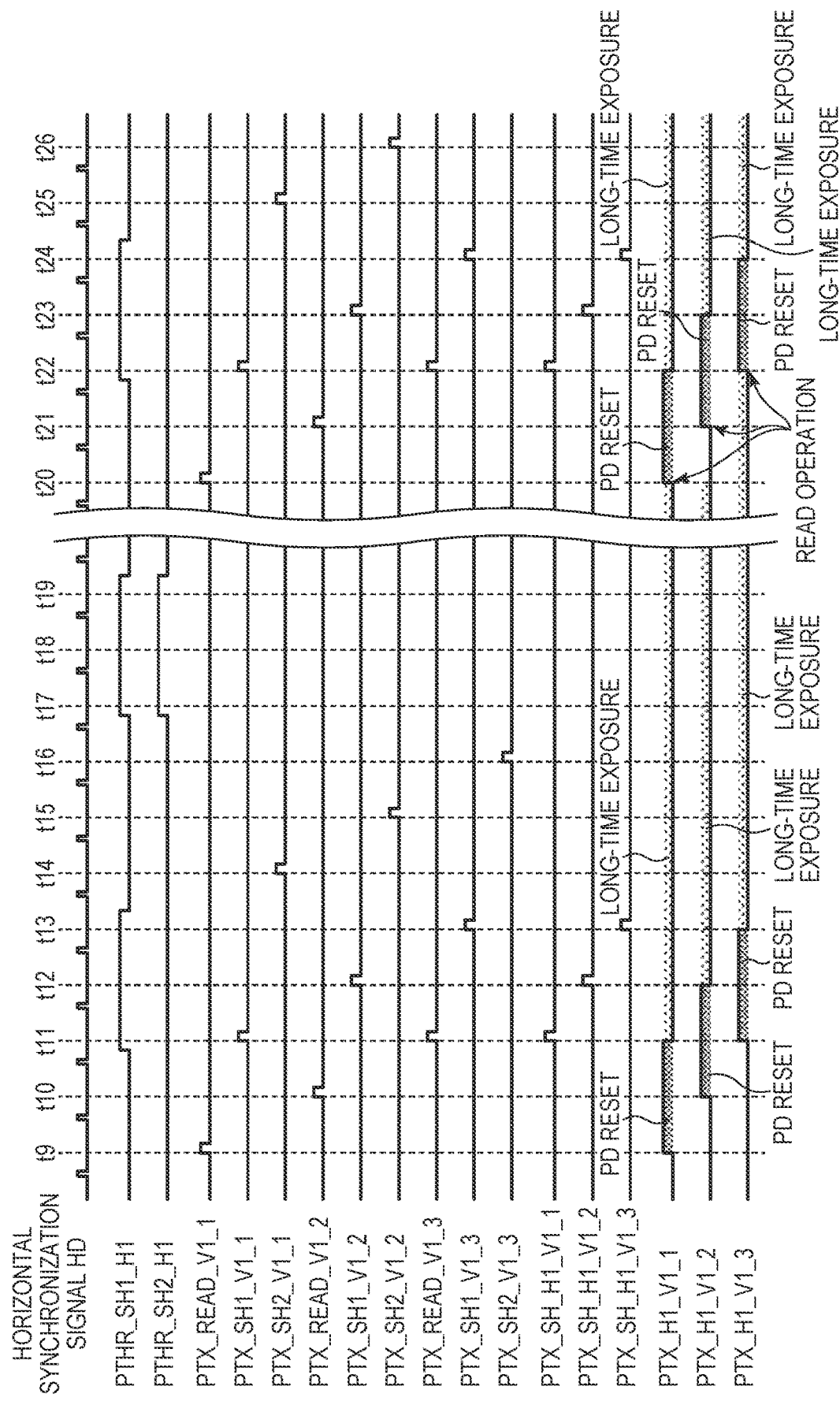
FIG. 16, FIG. 17 and FIG. 18 are timing charts illustrating a drive example of the photoelectric conversion device according to the fourth embodiment of the present invention.
Figure 17:
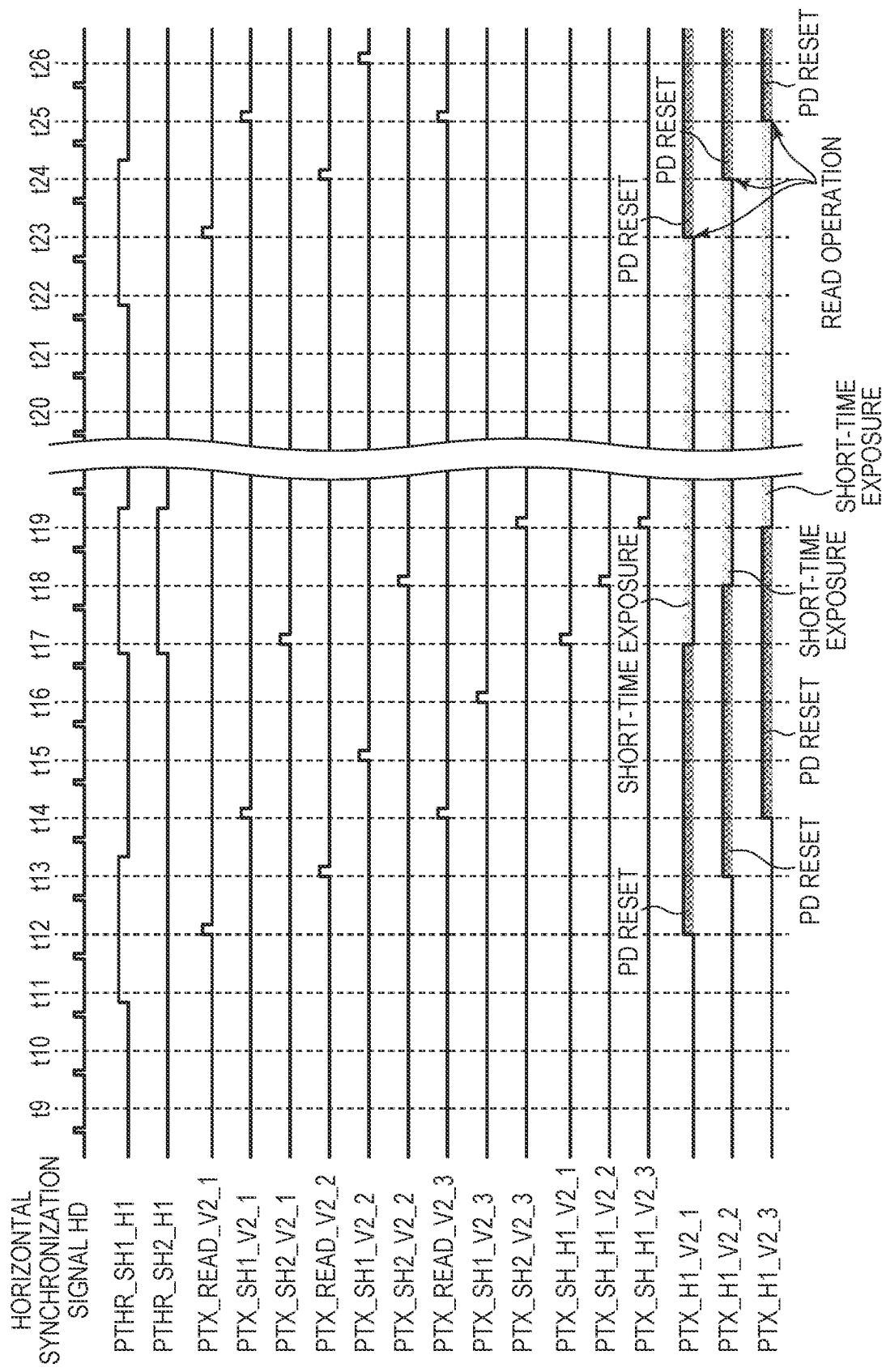
Figure 18:
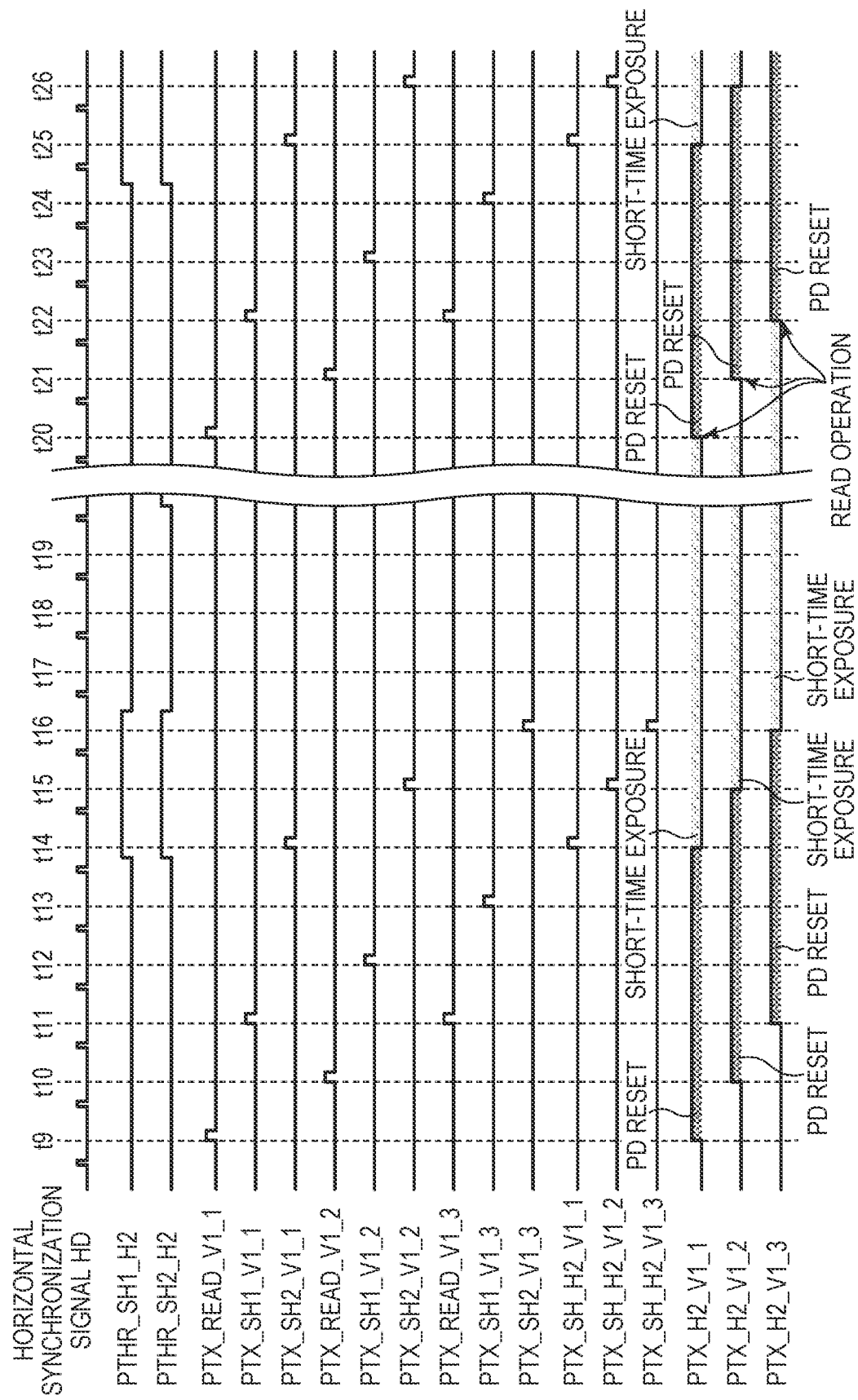

Next, the method of driving the photoelectric conversion device according to the present embodiment will be described by using FIG. 16 to FIG. 18. FIG. 16 to FIG. 18 are timing charts illustrating a drive example of the photoelectric conversion device according to the present embodiment.

FIG. 16 and FIG. 17 are timing charts illustrating the operation of the select circuit block 302_H1. FIG. 16 illustrates only the operation of the pixel block row V1. FIG. 17 illustrates only the operation of the pixel block row V2. The horizontal synchronization signal HD is a signal of notification of start timing of an operation for one row. Note that the time axis is common to FIG. 16 and FIG. 17.

First, the operation of the pixel block row V1 will be described by using FIG. 16. First, at time t9, the control signal PTX_READ_V1_1 for the first pixel row is controlled to the H level. At subsequent time t10, the control signal PTX_READ_V1_2 for the second pixel row is controlled to the H level. At subsequent time t11, the control signal PTX_READ_V1_3 for the third pixel row is controlled to the H level. Thereby, in the select circuit 1301 arranged on the pixel block row V1, the S-R latch circuit 1306 is set, and control signals PTX_H1_V1_1, PTX_H1_V1_2, and PTX_H1_V1_3 are at the H level, respectively. That is, time t9, time t10, and time t11 are timings of the start of reset periods of the photoelectric converters PD of the pixels P belonging to the first row, the second row, and the third row, respectively.

Subsequently, at time t11, the control signal PTX_SH1_V1_1 for the first pixel row is controlled to the H level. At subsequent time t12, the control signal PTX_SH1_V1_2 for the second pixel row is controlled to the H level. At subsequent time t13, the control signal PTX_SH1_V1_3 for the third pixel row is controlled to the H level. The control signals PTX_SH1_V1_1, PTX_SH1_V1_2, and PTX_SH1_V1_3 correspond to the first shutter operation (SH1).

At timings when the control signals PTX_SH1_V1_1, PTX_SH1_V1_2, and PTX_SH1_V1_3 transition to the H level, the control signals PTHR_SH1_H1 is already at the H level. This indicates that all the control signals PTX_SH1_V1_1, PTX_SH1_V1_2, and PTX_SH1_V1_3 are enabled. Thereby, the control signal PTX_SH_H1_V1_1 is at the H level at time t11, the control signal PTX_SH_H1_V1_2 is at the H level at time t12, and the control signal PTX_SH_H1_V1_3 is at the H level at time t13.

The S-R latch circuit 1306 is reset in the select circuit 1301, and all the control signals PTX_H1_V1_1, PTX_H1_V1_2, and PTX_H1_V1_3 are at the L level. That is, time t11, time t12, and time t13 are timings of the end of reset periods and also timings of the start of exposure periods in the photoelectric converters PD of the pixel P belonging to the first row, the second row, and the third row, respectively. Note that, since the operation "SH1" is enabled, this exposure period is an exposure period for long-time exposure in which the exposure time is relatively long.

Subsequently, at time t14, the control signals PTX_SH2_V1_1 for the first pixel row is controlled to the H level. At subsequent time t15, the control signals PTX_SH2_V1_2 for the second pixel row is controlled to the H level. At subsequent time t16, the control signals PTX_SH2_V1_3 for the third pixel row is controlled to the H level. The control signals PTX_SH2_V1_1, PTX_SH2_V1_2, and PTX_SH2_V1_3 correspond to the second shutter operation (SH2).

At timings when the control signals PTX_SH2_V1_1, PTX_SH2_V1_2, and PTX_SH2_V1_3 transition to the H level, the control signals PTHR_SH2_H1 is already at the L level. This indicates that all the control signals PTX_SH2_V1_1, PTX_SH2_V1_2, and PTX_SH2_V1_3 are disabled. Thereby, the control signal PTX_SH_H1_V1_1 remains at the L level at time t14. Further, the control signal PTX_SH_H1_V1_2 remains at the L level at time t15. Further, the control signal PTX_SH_H1_V1_3 remains at the L level at time t16.

Subsequently, at time t20, the control signal PTX_READ_V1_1 for the first pixel row is controlled to the H level. At subsequent time t21, the control signal PTX_READ_V1_2 for the second pixel row is controlled to the H level. At subsequent time t22, the control signal PTX_READ_V1_3 for the third pixel row is controlled to the H level. This indicates read operations to read charge accumulated in the photoelectric converters PD, and the exposure periods on respective rows end upon the completion of these operations.

Subsequently, at time t22, the control signal PTX_SH1_V1_1 for the first pixel row is controlled to the H level. At subsequent time t23, the control signal PTX_SH1_V1_2 for the second pixel row is controlled to the H level. At subsequent time t24, the control signal PTX_SH1_V1_3 for the third pixel row is controlled to the H level. Thereby, all the control signals PTX_H1_V1_1, PTX_H1_V1_2, and PTX_H1_V1_3 are at the L level. That is, time t22, time t23, and time t24 are the timings of the start of next exposure periods in the photoelectric converters PD of the pixels P belonging to the first row, the second row, and the third row, respectively.

Next, the operation of the pixel block row V2 will be described by using FIG. 17.

First, at time t12, the control signal PTX_READ_V2_1 for the first pixel row is controlled to the H level. At subsequent time t13, the control signal PTX_READ_V2_2 for the second pixel row is controlled to the H level. At subsequent time t14, the control signal PTX_READ_V2_3 for the third pixel row is controlled to the H level. Thereby, in the select circuit 1301 arranged on the pixel block row V2, the S-R latch circuit 1306 is set, and control signals PTX_H1_V2_1, PTX_H1_V2_2, and PTX_H1_V2_3 are at the H level, respectively. That is, time t12, time t13, and time t14 are timings of the start of reset periods of the photoelectric converters PD of the pixels P belonging to the first row, the second row, and the third row, respectively.

Subsequently, at time t14, the control signal PTX_SH1_V2_1 for the first pixel row is controlled to the H level. At subsequent time t15, the control signal PTX_SH1_V2_2 for the second pixel row is controlled to the H level. At subsequent time t16, the control signal PTX_SH1_V2_3 for the third pixel row is controlled to the H level. The control signals PTX_SH1_V2_1, PTX_SH1_V2_2, and PTX_SH1_V2_3 correspond to the first shutter operation (SH1). At timings when the control signals PTX_SH1_V2_1, PTX_SH1_V2_2, and PTX_SH1_V2_3 transition to the H level, the control signals PTHR_SH1_H1 is already at the L level. This indicates that all the control signals PTX_SH1_V2_1, PTX_SH1_V2_2, and PTX_SH1_V2_3 are disabled.

Thereby, the control signal PTX_H_H1_V2_1 remains at the L level at time t14. Further, the control signal PTX_SH_H1_V2_2 remains at the L level at time t15. Further, the control signal PTX_SH_H1_V2_3 remains at the L level at time t16.

Subsequently, at time t17, the control signals PTX_SH2_V2_1 for the first pixel row is controlled to the H level. At subsequent time t18, the control signals PTX_SH2_V2_2 for the second pixel row is controlled to the H level. At subsequent time t19, the control signals PTX_SH2_V2_3 for the third pixel row is controlled to the H level. The control signals PTX_SH2_V2_1, PTX_SH2_V2_2, and PTX_VH2_V2_3 correspond to the second shutter operation (SH2). At timings when the control signals PTX_SH2_V2_1, PTX_SH2_V2_2, and PTX_SH2_V2_3 are controlled to the H level, the control signals PTHR_SH2_H1 is already at the H level. This indicates that all the control signals PTX_SH2_V2_1, PTX_SH2_V2_2, and PTX_SH2_V2_3 are enabled.

Thereby, the control signal PTX_SH_H1_V2_1 is at the H level at time t17, the control signal PTX_SH_H1_V2_2 is at the H level at time t18, and the control signal PTX_SH_H1_V2_3 is at the H level at time t19. The S-R latch circuit 1306 is reset in the select circuit 1301, and all the control signals PTX_H1_V2_1, PTX_H1_V2_2, and PTX_H1_V2_3 are at the L level. That is, time t17, time t18, and time t19 are timings of the end of reset periods and also timings of the start of exposure periods in the photoelectric converters PD of the pixel P belonging to the first row, the second row, and the third row, respectively. Note that, since the operation "SH2" is enabled, this exposure period is an exposure period for short-time exposure in which the exposure time is relatively short.

Subsequently, at time t23, the control signal PTX_READ_V2_1 for the first pixel row is controlled to the H level. At subsequent time t24, the control signal PTX_READ_V2_2 for the second pixel row is controlled to the H level. At subsequent time t25, the control signal PTX_READ_V2_3 for the third pixel row is controlled to the H level. This indicates read operations to read out charge accumulated in the photoelectric converters PD, and the exposure periods on respective rows end upon the completion of these operations.

FIG. 18 is a timing chart illustrating the operation of the select circuit block 302_H2. FIG. 18 illustrates only the operation of the pixel block row V1. Note that the time axis is common to FIG. 16 to FIG. 18.

First, at time t9, the control signal PTX_READ_V1_1 for the first pixel row is controlled to the H level. At subsequent time t10, the control signal PTX_READ_V1_2 for the second pixel row is controlled to the H level. At subsequent time t11, the control signal PTX_READ_V1_3 for the third pixel row is controlled to the H level. Thereby, in the select circuit 1301 arranged on the pixel block row V1, the S-R latch circuit 1306 is set, and control signals PTX_H2_V1_1, PTX_H2_V1_2, and PTX_H2_V1_3 are at the H level, respectively. That is, time t9, time t10, and time t11 are timings of the start of reset periods of the photoelectric converters PD of the pixels P belonging to the first row, the second row, and the third row, respectively. This operation is the same as that on the pixel block column H1.

Subsequently, at time t11, the control signal PTX_SH1_V1_1 for the first pixel row is controlled to the H level. At subsequent time t12, the control signal PTX_SH1_V1_2 for the second pixel row is controlled to the H level. At subsequent time t13, the control signal PTX_SH1_V1_3 for the third pixel row is controlled to the H level. The control signals PTX_SH1_V1_1, PTX_SH1_V1_2, and PTX_SH1_V1_3 correspond to the first shutter operation (SH1).

At timings when the control signals PTX_SH1_V1_1, PTX_SH1_V1_2, and PTX_SH1_V1_3 transition to the H level, the control signals PTHR_SH1_H2 is already at the L level. This indicates that all the control signals PTX_SH1_V1_1, PTX_SH1_V1_2, and PTX_SH1_V1_3 are disabled. Thereby, the control signal PTX_SH_H2_V1_1 remains at the L level at time t11. Further, the control signal PTX_SH_H2_V1_2 remains at the L level at time t12. Further, the control signal PTX_SH_H2_V1_3 remains at the L level at time t13.

Subsequently, at time t14, the control signals PTX_SH2_V1_1 for the first pixel row is controlled to the H level. At subsequent time t15, the control signals PTX_SH2_V1_2 for the second pixel row is controlled to the H level. At subsequent time t16, the control signals PTX_SH2_V1_3 for the third pixel row is controlled to the H level. The control signals PTX_SH2_V1_1, PTX_SH2_V1_2, and PTX_SH2_V1_3 correspond to the second shutter operation (SH2).

At timings when the control signals PTX_SH2_V1_1, PTX_SH2_V1_2, and PTX_SH2_V1_3 transition to the H level, the control signals PTHR_SH2_H2 is already at the H level. This indicates that all the control signals PTX_SH2_V1_1, PTX_SH2_V1_2, and PTX_SH2_V1_3 are enabled. Thereby, the control signal PTX_SH_H2_V1_1 transitions to the H level at time t14, the control signal PTX_SH_H2_V1_2 transitions to the H level at time t15, and the control signal PTX_SH_H2_V1_3 transitions to the H level at time t16.

The S-R latch circuit 1306 is reset in the select circuit 1301, and all the control signals PTX_H2_V1_1, PTX_H2_V1_2, and PTX_H2_V1_3 are at the L level. That is, time t14, time t15, and time t16 are timings of the end of reset periods and also timings of the start of exposure periods in the photoelectric converters PD of the pixel P belonging to the first row, the second row, and the third row, respectively. Note that, since the operation "SH2" is enabled, this exposure period is an exposure period for short-time exposure.

Subsequently, at time t20, the control signal PTX_READ_V1_1 for the first pixel row is controlled to the H level. At subsequent time t21, the control signal PTX_READ_V1_2 for the second pixel row is controlled to the H level. At subsequent time t22, the control signal PTX_READ_V1_3 for the third pixel row is controlled to the H level. This indicates read operations to read out charge accumulated in the photoelectric converters PD, and the exposure periods on respective rows end upon the completion of these operations.

As described above, according to the present embodiment, since the photoelectric converter PD is held in a reset state out of an exposure period, the effect of suppressing charge leakage is higher than in a case where the operation "RST" is intermittently introduced. That is, while there is a likelihood in the first to third embodiments that a light of high intensity is received in a period from "RST" to "SH" and charge leaks out of the photoelectric converter PD, there is no such likelihood in the present embodiment. Further, while the operation in which the operation "RST" is intermittently introduced requires calculation of the number of times of operations "RST" which is sufficient for suppressing charge leakage as disclosed in Japanese Patent Application Laid-Open No. 2012-151847, the present embodiment does not require such an operation. Further, by providing a latch circuit within the pixel control unit 102, it is possible to realize the operation to hold a reset state of the photoelectric converter PD by using a logic circuit. Thereby, circuit design is easier than a case where an exposure period is controlled by an analog circuit, no analog noise occurs in a circuit operation, and therefore variation in the exposure period can be suppressed.

Fifth Embodiment

A photoelectric conversion device and a method of driving the same according to a fifth embodiment of the present invention will be described with reference to FIG. 19 to FIG. 23. The same components as those of the photoelectric conversion device according to the first to fourth embodiments are labeled with the same references, and the description thereof will be omitted or simplified.

The present embodiment is different from the fourth embodiment in that, in an operation to read out charge from the photoelectric converter PD (read operation), an operation to control the control signal PTX is performed in the order of the H level, the L level, and the H level. Further, the present embodiment is difference from the fourth embodiment in that the select circuit block 302 is formed by using an S-R latch circuit and a D-type flip-flop circuit to realize the above operation.

Figure 19:
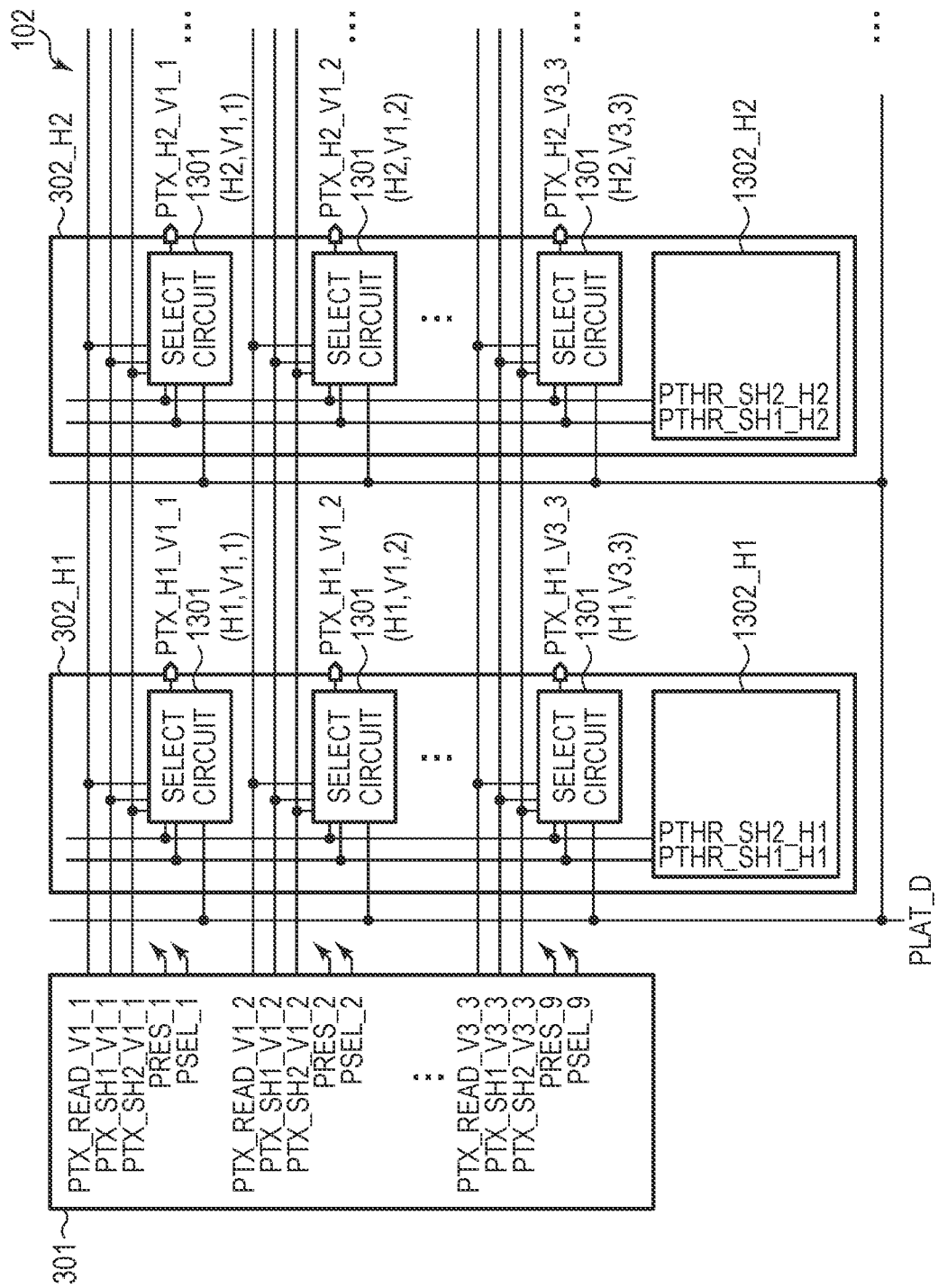
FIG. 19 is a block diagram illustrating a configuration example of a pixel control unit in a photoelectric conversion device according to a fifth embodiment of the present invention.

FIG. 19 is a block diagram illustrating a configuration example of the pixel control unit 102 in the photoelectric conversion device according to the present embodiment. The entire configuration of the pixel control unit 102 in the photoelectric conversion device according to the present embodiment is the same as that of the pixel control unit 102 in the photoelectric conversion device according to the fourth embodiment except that a control signal PLAT D is input commonly to all the select circuits 1301 as illustrated in FIG. 19.

Figure 20:
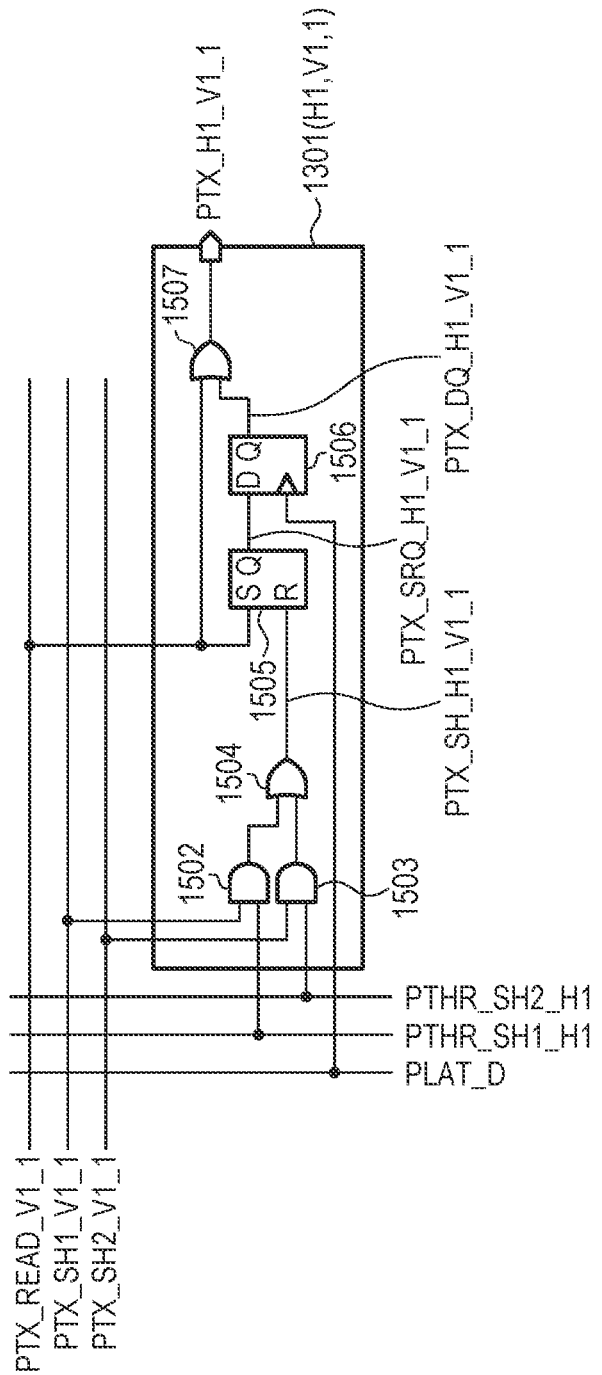
FIG. 20 is a block diagram illustrating a configuration example of a select circuit in the photoelectric conversion device according to the fifth embodiment of the present invention.

FIG. 20 is a circuit diagram illustrating a configuration example of the select circuit 1301 in the photoelectric conversion device according to the present embodiment. FIG. 20 illustrates a configuration example of the select circuit 1301(H1, V1, 1) as an example of the select circuit 1301(HL, VM, N).

The select circuit 1301(H1, V1, 1) includes an AND gate for SH1 1502, an AND gate for SH2 1503, an OR gate for SH 1504, an S-R latch circuit 1505, a D latch circuit 1506, and an OR gate for output 1507, for example. The S-R latch circuit 1505 is a latch circuit formed of an S-R flip-flop. The D latch circuit 1506 is a latch circuit formed of a D-type flip-flop.

The control signal PTX_SH1_V1_1 and the control signal PTHR_SH1_H1 are input to the AND gate for SH1 1502. That is, the control signal PTX_SH1_V1_1 is output to the OR gate for SH 1504 on the post-stage only when the control signal PTHR_SH1_H1 is at the H level. Similarly, the control signal PTX_SH2_V1_1 and the control signal PTHR_SH2_H1 are input to the AND gate for SH2 1503. That is, the control signal PTX_SH2_V1_1 is output to the OR gate for SH 1504 on the post-stage only when the control signal PTHR_SH2_H1 is at the H level. Note that selection of pass/not-pass of the control signals PTX_SH1_V1_1 and PTX_SH2_V1_1 corresponds to selection of enable/disable of the shutter operation. The OR gate for SH 1504 outputs the control signals PTX_SH_H1_V1_1 in response to an output signal of the AND gate for SH1 1502 and an output signal of the AND gate for SH2 1503.

The S-R latch circuit 1505 outputs a control signal PTX_SRQ_H1_V1_1 from the output terminal (Q) in response to the input of the control signal PTX_READ_V1_1 to the set terminal (S) and the input of the control signal PTX_SH_H1_V1_1 to the reset terminal (R). The D latch circuit 1506 outputs a control signal PTX_DQ_H1_V1_1 from the output terminal (Q) in response to the input of a control signal PTX_SRQ_H1_V1_1 to the data terminal (D) and the input of the control signal PLAT_D to the clock terminal. The OR gate for output 1507 outputs the control signal PTX_H1_V1_1 in response to the input of the control signal PTX_READ_V1_1 and the control signal PTX_DQ_H1_V1_1. This control signal PTX_H1_V1_1 is the output signal of the select circuit 1301 (H1, V1, 1).

The S-R latch circuit 1505 is used for holding a reset state and an exposure state of the photoelectric converter PD. Further, the D latch circuit 1506 is used for controlling start/end timings of a reset state and an exposure state.

As described above, the select circuit 1301 in the photoelectric conversion device according to the present embodiment includes at least two signal level holding units used for generating control signals supplied to transfer transistors of pixels belonging to a corresponding pixel block row.

A signal level holding unit arranged on the pre-stage out of the two signal level holding units holds the level of the output signal at the H level during a period from a rising edge of a control signal indicating a read timing to a rising edge of a control signal indicating an effective reset timing. This pre-stage signal level holding unit corresponds to the S-R latch circuit 1505 in the select circuit 1301 of FIG. 20.

A signal level holding unit arranged on the post-stage out of the two signal level holding units holds the level of the output signal at the H level in response to the output signal of the pre-stage signal level holding unit and a timing control signal (control signal PLAT_D) indicating a start timing of a reset period of the photoelectric converter. This post-stage signal level holding unit corresponds to the D latch circuit 1506 in the select circuit 1301 of FIG. 20. The timing control signal is a signal that is input commonly to all the select circuits 1301.

Figure 21:
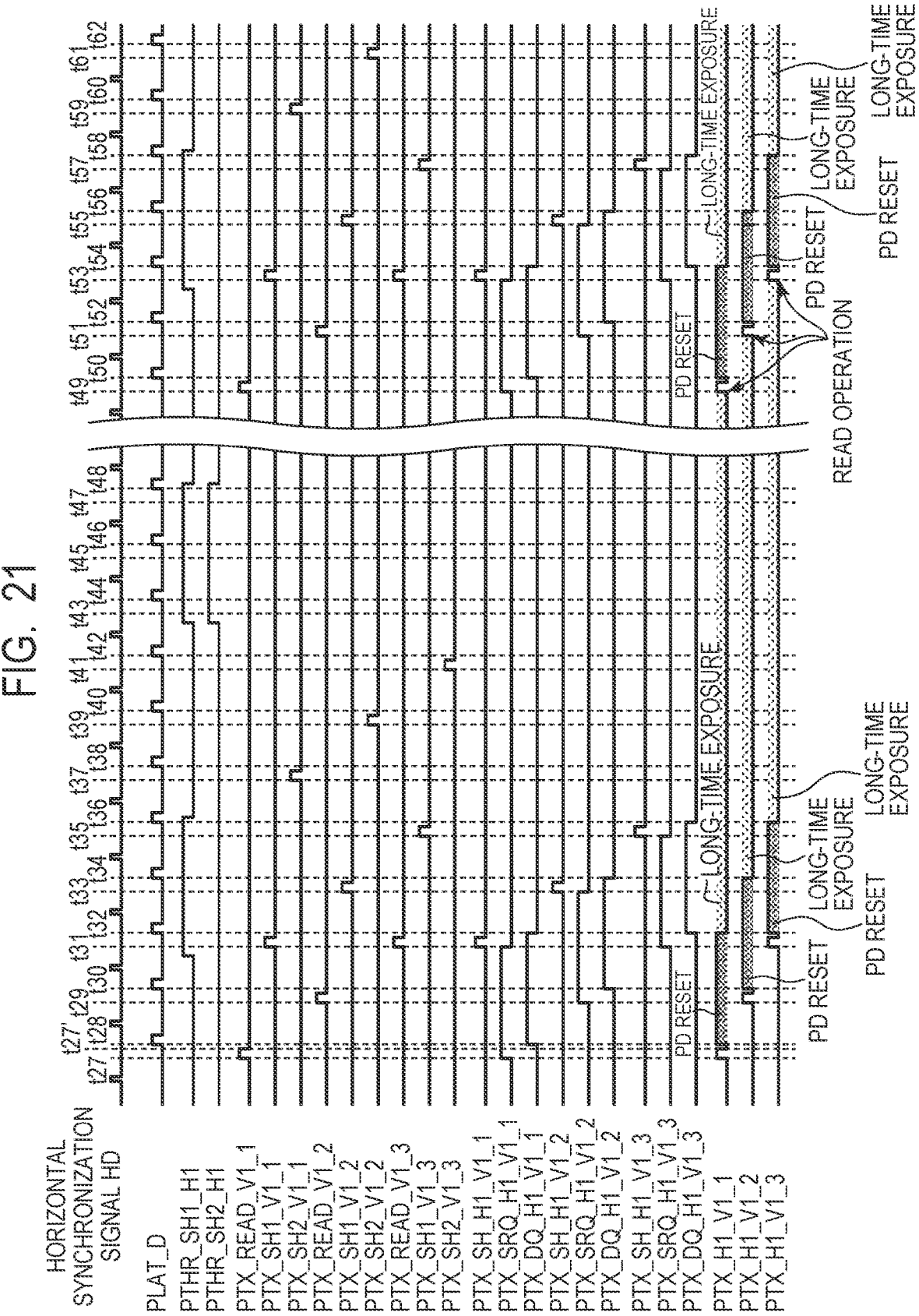
FIG. 21, FIG. 22 and FIG. 23 are timing charts illustrating a drive example of the photoelectric conversion device according to the fifth embodiment of the present invention.
Figure 22:
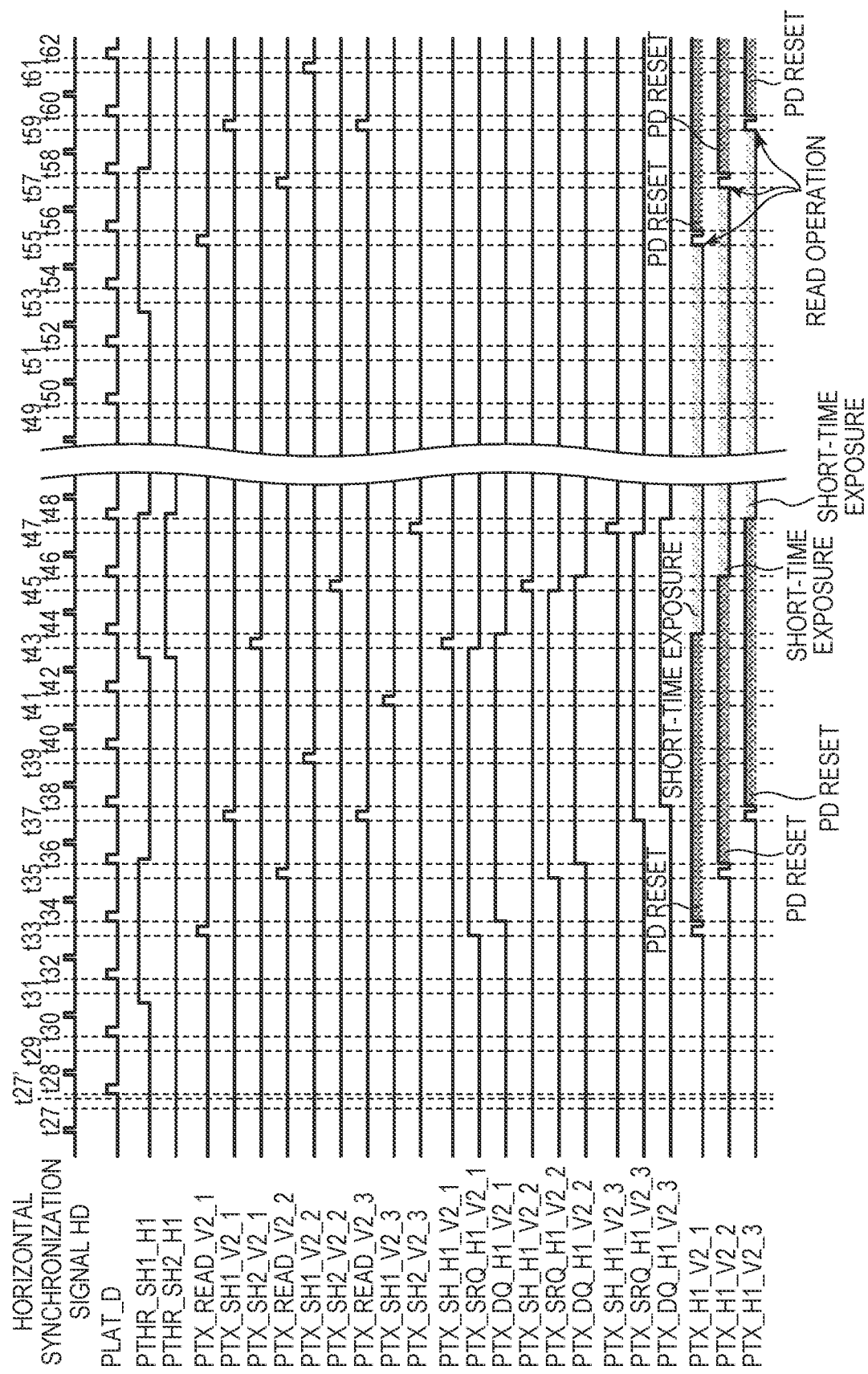
Figure 23:
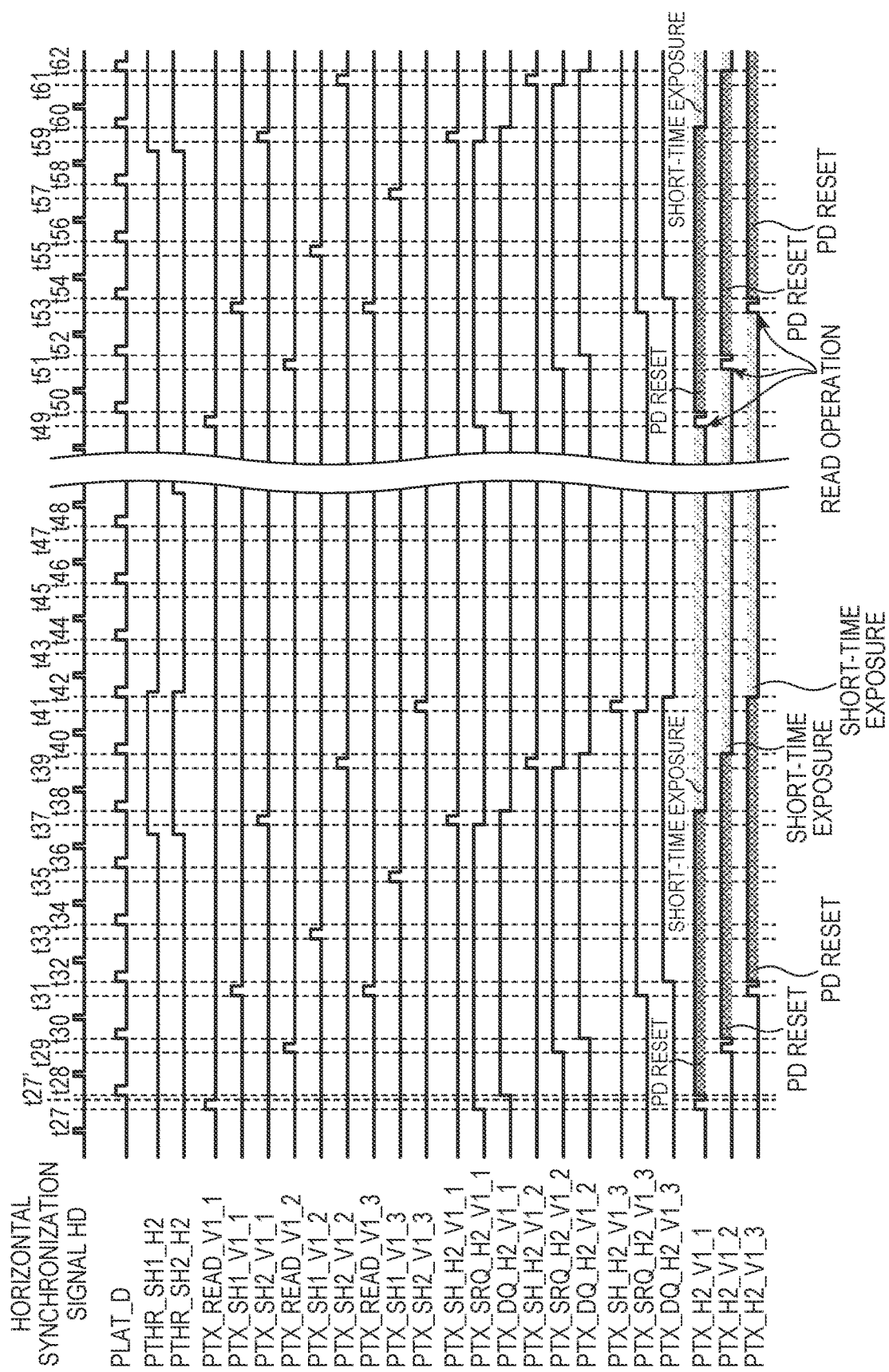

Next, the method of driving the photoelectric conversion device according to the present embodiment will be described by using FIG. 21 to FIG. 23. FIG. 21 to FIG. 23 are timing charts illustrating an operation example of the photoelectric conversion device according to the present embodiment.

FIG. 21 and FIG. 22 are timing charts illustrating the operation of the select circuit block 302_H1. FIG. 21 illustrates only the operation of the pixel block row V1. FIG. 22 illustrates only the operation of the pixel block row V2. Note that the time axis is common to FIG. 21 and FIG. 22.

First, the operation of the pixel block row V1 will be described by using FIG. 21.

First, in the period from time t27 to time t27', the control signal PTX_READ_V1_1 for the first pixel row is controlled to the H level. Thereby, in the select circuit 1301(H1, V1, 1), the control signal PTX_H1_V1_1 transitions to the H level and, at the same time, the S-R latch circuit 1505 is set and the control signal PTX_SRQ_H1_V1_1 transitions to the H level.

Subsequently, at time t28, the control signal PLAT_D transitions to the H level, and thereby the D latch circuit 1506 outputs the H-level control signal PTX_DQ_H1_V1_1 in response to the H-level control signal PTX_SRQ_H1_V1_1. Thereby, the control signal PTX_H1_V1_1 that is the output signal of the OR gate for output 1507 transitions to the H level.

Note that, since the control signal PTX_READ_V1_1 has returned to the L level at the time of time t27' before time t28, the control signal PTX_H1_V1_1 has returned to the L level in the period from time t27' to time t28. Therefore, the start timing of a reset period of the photoelectric converters PD in the pixels P belonging to the first row is at time t28 when the control signal PLAT_D transitions to the H level. The relationship of the order of these timings (the relationship of the order that the control signal PTX_READ transitions to the L level before the control signal PLAT_D transitions to the H level when one horizontal period is focused on) is the same in the operation of all the subsequent select circuits 1301.

Subsequently, at time t29, the control signal PTX_READ_V1_2 for the second pixel row is controlled to the H level. Thereby, in the select circuit 1301(H1, V1, 2), the control signal PTX_H1_V1_2 transitions to the H level and, at the same time, the S-R latch circuit 1505 is set, and the control signal PTX_SRQ_H1_V1_2 transitions to the H level.

Subsequently, at time t30, the control signal PLAT_D transitions to the H level, and thereby the D latch circuit 1506 outputs the H-level control signal PTX_DQ_H1_V1_2 in response to the H-level control signal PTX_SRQ_H1_V1_2. Thereby, the control signal PTX_H1_V1_2 that is the output signal of the OR gate for output 1507 transitions to the H level. Time t30 is the start timing of a reset period of the photoelectric converters PD of the pixels P belonging to the second row.

Subsequently, at time t31, the control signal PTX_READ_V1_3 for the third pixel row is controlled to the H level. Thereby, in the select circuit 1301(H1, V1, 3), the control signal PTX_H1_V1_3 transitions to the H level and, at the same time, the S-R latch circuit 1505 is set, and the control signal PTX_SRQ_H1_V1_3 transitions to the H level.

Subsequently, at time t32, the control signal PLAT_D transitions to the H level, and thereby the D latch circuit 1506 outputs the H-level control signal PTX_DQ_H1_V1_3 in response to the H-level control signal PTX_SRQ_H1_V1_3. Thereby, the control signal PTX_H1_V1_3 that is the output signal of the OR gate for output 1507 transitions to the H level. Time t32 is the start timing of a reset period of the photoelectric converters PD of the pixels P belonging to the third row.

Next, at time t31, the control signal PTX_SH1_V1_1 for the first pixel row is controlled to the H level. The control signal PTX_SH1_V1_1 corresponds to the first shutter operation (SH1). At the timing when the control signal PTX_SH1_V1_1 transitions to the H level, the control signal PTHR_SH1_H1 is already at the H level. This indicates that the control signal PTX_SH1_V1_1 is enabled. Thereby, at time t31, the control signals PTX_SH_H1_V1_1 transitions to the H level. In the select circuit 1301, the S-R latch circuit 1505 is reset, and the control signal PTX_SRQ_H1_V1_1 transitions to the L level.

Subsequently, at time t32, the control signal PLAT_D transitions to the H level, and thereby the D latch circuit 1506 outputs the L-level control signal PTX_DQ_H1_V1_1 in response to the L-level control signal PTX_SRQ_H1_V1_1. Thereby, the control signal PTX_H1_V1_1 that is the output signal of the OR gate for output 1507 transitions to the L level. That is, time t32 is the end timing of the reset period and also the start timing of an exposure period in the photoelectric converters PD of the pixels P belonging to the first row.

Subsequently, at time t33, the control signal PTX_SH1_V1_2 for the second pixel row is controlled to the H level. The control signal PTX_SH1_V1_2 corresponds to the first shutter operation (SH1). At the timing when the control signal PTX_SH1_V1_2 transitions to the H level, the control signal PTHR_SH1_H1 is already at the H level. This indicates that the control signal PTX_SH1_V1_2 is enabled. Thereby, at time t33, the control signals PTX_SH_H1_V1_2 transitions to the H level. In the select circuit 1301, the S-R latch circuit 1505 is reset, and the control signal PTX_SRQ_H1_V1_2 transitions to the L level.

Subsequently, at time t34, the control signal PLAT_D transitions to the H level, and thereby the D latch circuit 1506 outputs the L-level control signal PTX_DQ_H1_V1_2 in response to the L-level control signal PTX_SRQ_H1_V1_2. Thereby, the control signal PTX_H1_V1_2 that is the output signal of the OR gate for output 1507 transitions to the L level. That is, time t34 is the end timing of the reset period and also the start timing of an exposure period in the photoelectric converters PD of the pixels P belonging to the second row.

Subsequently, at time t35, the control signal PTX_SH1_V1_3 for the third pixel row is controlled to the H level. The control signal PTX_SH1_V1_3 corresponds to the first shutter operation (SH1). At the timing when the control signal PTX_SH1_V1_3 transitions to the H level, the control signal PTHR_SH1_H1 is already at the H level. This indicates that the control signal PTX_SH1_V1_3 is enabled. Thereby, at time t35, the control signals PTX_SH_H1_V1_3 transitions to the H level. In the select circuit 1301, the S-R latch circuit 1505 is reset, and the control signal PTX_SRQ_H1_V1_3 transitions to the L level.

Subsequently, at time t36, the control signal PLAT_D transitions to the H level, and thereby the D latch circuit 1506 outputs the L-level control signal PTX_DQ_H1_V1_3 in response to the L-level control signal PTX_SRQ_H1_V1_3. Thereby, the control signal PTX_H1_V1_3 that is the output signal of the OR gate for output 1507 transitions to the L level. That is, time t36 is the end timing of the reset period and also the start timing of an exposure period in the photoelectric converters PD of the pixels P belonging to the third row.

Subsequently, at time t37, the control signals PTX_SH2_V1_1 for the first pixel row is controlled to the H level. At subsequent time t39, the control signals PTX_SH2_V1_2 for the second pixel row is controlled to the H level. At subsequent time t41, the control signals PTX_SH2_V1_3 for the third pixel row is controlled to the H level. The control signals PTX_SH2_V1_1, PTX_SH2_V1_2, and PTX_SH2_V1_3 correspond to the second shutter operation (SH2).

At timings when the control signals PTX_SH2_V1_1, PTX_SH2_V1_2, and PTX_SH2_V1_3 transition to the H level, the control signals PTHR_SH2_H1 is already at the L level. This indicates that the control signals PTX_SH2_V1_1, PTX_SH2_V1_2, and PTX_SH2_V1_3 are disabled. Thereby, the control signal PTX_SH_H1_V1_1 remains at the L level at time t37. Further, the control signal PTX_SH_H1_V1_2 remains at the L level at time t39. Further, the control signal PTX_SH_H1_V1_3 remains at the L level at time t41. Note that since the operation "SH1" is enabled and the operation "SH2" is disabled, the exposure period is an exposure period of long-time exposure.

At subsequent time t49, t50, t51, t52, t53, and t54, the same operations as those at time t27, t28, t29, t30, t31, and t32 are performed. These operations cause the control signals PTX_READ_V1_1, PTX_READ_V1_2, and PTX_READ_V1_3 transition to the H level, the L level, and the H level in this order, respectively. This operation is a read operation to read out charge accumulated in the photoelectric converter PD. The exposure periods on respective rows end upon the completion of this read operation.

Further, the operations at time t53, t54, t55, t56, t57, t58, t59, and t60 are the same as the operations at time t31, t32, t33, t34, t35, t36, t37, and t38.

Next, the operation of the pixel block row V2 will be described by using FIG. 22. First, at time t33, the control signal PTX_READ_V2_1 for the first pixel row is controlled to the H level. Thereby, in the select circuit 1301(H1, V2, 1), the control signal PTX_H1_V2_1 transitions to the H level and, at the same time, the S-R latch circuit 1505 is set, and the control signal PTX_SRQ_H1_V2_1 transitions to the H level.

Subsequently, at time t34, the control signal PLAT_D transitions to the H level, and thereby the D latch circuit 1506 outputs the H-level control signal PTX_DQ_H1_V2_1 in response to the H-level control signal PTX_SRQ_H1_V2_1. Thereby, the control signal PTX_H1_V2_1 that is the output signal of the OR gate for output 1507 transitions to the H level. Time t34 corresponds to the start timing of a reset period of the photoelectric converters PD in the pixels P belonging to the first row.

Subsequently, at time t35, the control signal PTX_READ_V2_2 for the second pixel row is controlled to the H level. Thereby, in the select circuit 1301(H1, V2, 2), the control signal PTX_H1_V2_2 transitions to the H level and, at the same time, the S-R latch circuit 1505 is set, and the control signal PTX_SRQ_H1_V2_2 transitions to the H level.

Subsequently, at time t36, the control signal PLAT_D transitions to the H level, and thereby the D latch circuit 1506 outputs the H-level control signal PTX_DQ_H1_V2_2 in response to the H-level control signal PTX_SRQ_H1_V2_2. Thereby, the control signal PTX_H1_V2_2 that is the output signal of the OR gate for output 1507 transitions to the H level. Time t36 is the start timing of a reset period of the photoelectric converters PD of the pixels P belonging to the second row.

Subsequently, at time t37, the control signal PTX_READ_V2_3 for the third pixel row is controlled to the H level. Thereby, in the select circuit 1301(H1, V2, 3), the control signal PTX_H1_V2_3 transitions to the H level and, at the same time, the S-R latch circuit 1505 is set, and the control signal PTX_SRQ_H1_V2_3 transitions to the H level.

Subsequently, at time t38, the control signal PLAT_D transitions to the H level, and thereby the D latch circuit 1506 outputs the H-level control signal PTX_DQ_H1_V2_3 in response to the H-level control signal PTX_SRQ_H1_V2_3. Thereby, the control signal PTX_H1_V2_3 that is the output signal of the OR gate for output 1507 transitions to the H level. Time t38 is the start timing of a reset period of the photoelectric converters PD of the pixels P belonging to the third row.

Next, at time t37, the control signal PTX_SH1_V2_1 for the first pixel row is controlled to the H level. At subsequent time t39, the control signal PTX_SH1_V2_2 for the second pixel row is controlled to the H level. At subsequent time t41, the control signal PTX_SH1_V2_3 for the third pixel row is controlled to the H level. The control signals PTX_SH1_V2_1, PTX_SH1_V2_2, and PTX_SH1_V2_3 correspond to the first shutter operation (SH1).

At the timing when the control signals PTX_SH1_V2_1, PTX_SH1_V2_2, and PTX_SH1_V2_3 transition to the H level, the control signal PTHR_SH1_H1 is already at the L level. This indicates that the control signals PTX_SH1_V2_1, PTX_SH1_V2_2, and PTX_SH1_V2_3 are disabled. Thereby, at time t37, the control signal PTX_SH_H1_V2_1 remains at the L level. Further, at time t39, the control signal PTX_SH_H1_V2_2 remains at the L level. Further, at time t41, the control signal PTX_SH_H1_V2_3 remains at the L level.

Subsequently, at time t43, the control signals PTX_SH2_V2_1 for the first pixel row is controlled to the H level. The control signal PTX_SH2_V2_1 corresponds to the second shutter operation (SH2). At the timing when the control signal PTX_SH2_V2_1 transitions to the H level, the control signal PTHR_SH2_H1 is already at the H level. This indicates that the control signal PTX_SH2_V2_1 is enabled. Thereby, at time t43, the control signal PTX_SH_H1_V2_1 transitions to the H level. In the select circuit 1301, the S-R latch circuit 1505 is reset, and the control signal PTX_SRQ_H1_V2_1 transitions to the L level.

Subsequently, at time t44, the control signal PLAT__D transitions to the H level, and thereby the D latch circuit 1506 outputs the L-level control signal PTX_DQ_H1_V2_1 in response to the L-level control signal PTX_SRQ_H1_V2_1. Thereby, the control signal PTX_H1_V2_1 that is the output signal of the OR gate for output 1507 transitions to the L level. That is, time t44 is the end timing of the reset period and also the start timing of an exposure period in the photoelectric converters PD of the pixels P belonging to the first row. Note that, since the operation "SH2" is enabled, this exposure period is an exposure period of short-time exposure.

Subsequently, at time t45, the control signals PTX_SH2_V2_2 for the second pixel row is controlled to the H level. The control signal PTX_SH2_V2_2 corresponds to the second shutter operation (SH2). At the timing when the control signal PTX_SH2_V2_2 transitions to the H level, the control signal PTHR_SH2_H1 is already at the H level. This indicates that the control signal PTX_SH2_V2_2 is enabled. Thereby, at time t45, the control signal PTX_SH_H1_V2_2 transitions to the H level. In the select circuit 1301, the S-R latch circuit 1505 is reset, and the control signal PTX_SRQ_H1_V2_2 transitions to the L level.

Subsequently, at time t46, the control signal PLAT_D transitions to the H level, and thereby the D latch circuit 1506 outputs the L-level control signal PTX_DQ_H1_V2_2 in response to the L-level control signal PTX_SRQ_H1_V2_2. Thereby, the control signal PTX_H1_V2_2 that is the output signal of the OR gate for output 1507 transitions to the L level. That is, time t46 is the end timing of the reset period and also the start timing of an exposure period in the photoelectric converters PD of the pixels P belonging to the second row. Note that, since the operation "SH2" is enabled, this exposure period is an exposure period of short-time exposure.

Subsequently, at time t47, the control signals PTX_SH2_V2_3 for the third pixel row is controlled to the H level. The control signal PTX_SH2_V2_3 corresponds to the second shutter operation (SH2). At the timing when the control signal PTX_SH2_V2_3 transitions to the H level, the control signal PTHR_SH2_H1 is already at the H level. This indicates that the control signal PTX_SH2_V2_3 is enabled. Thereby, at time t47, the control signal PTX_SH_H1_V2_3 transitions to the H level. In the select circuit 1301, the S-R latch circuit 1505 is reset, and the control signal PTX_SRQ_H1_V2_3 transitions to the L level.

Subsequently, at time t48, the control signal PLAT_D transitions to the H level, and thereby the D latch circuit 1506 outputs the L-level control signal PTX_DQ_H1_V2_3 in response to the L-level control signal PTX_SRQ_H1_V2_3. Thereby, the control signal PTX_H1_V2_3 that is the output signal of the OR gate for output 1507 transitions to the L level. That is, time t48 is the end timing of the reset period and also the start timing of an exposure period in the photoelectric converters PD of the pixels P belonging to the third row. Note that, since the operation "SH2" is enabled, this exposure period is an exposure period of short-time exposure.

At subsequent time t55, t56, t57, t58, t59, and t60, the same operations as those at time t33, t34, t35, t36, t37, and t38 are performed. This operation causes the control signals PTX_READ_V2_1, PTX_READ_V2_2, and PTX_READ_V2_3 transition to the H level, the L level, and the H level in this order, respectively. This operation is a read operation to read out charge accumulated in the photoelectric converter PD. The exposure periods on respective rows end upon the completion of this read operation.

FIG. 23 is a timing chart illustrating the operation of the select circuit block 302 H2. FIG. 23 illustrates only the operation of the pixel block row V1. Note that the time axis is common to FIG. 21 to FIG. 23.

First, in the period from time t27 to time t27', the control signal PTX_READ_V1_1 for the first pixel row is controlled to the H level. Thereby, in the select circuit 1301(H2, V1, 1), the control signal PTX_H2_V1_1 transitions to the H level and, at the same time, the S-R latch circuit 1505 is set, and the control signal PTX_SRQ_H2_V1_1 transitions to the H level.

Subsequently, at time t28, the control signal PLAT_D transitions to the H level, and thereby the D latch circuit 1506 outputs the H-level control signal PTX_DQ_H2_V1_1 in response to the H-level control signal PTX_SRQ_H2_V1_1. Thereby, the control signal PTX_H2_V1_1 that is the output signal of the OR gate for output 1507 transitions to the H level. Time t28 corresponds to the start timing of a reset period of the photoelectric converters PD in the pixels P belonging to the first row.

Subsequently, at time t29, the control signal PTX_READ_V1_2 for the second pixel row is controlled to the H level. Thereby, in the select circuit 1301 (H2, V1, 2), the control signal PTX_H2_V1_2 transitions to the H level and, at the same time, the S-R latch circuit 1505 is set and the control signal PTX_SRQ_H2_V1_2 transitions to the H level.

Subsequently, at time t30, the control signal PLAT_D transitions to the H level, and thereby the D latch circuit 1506 outputs the H-level control signal PTX_DQ_H2_V1_2 in response to the H-level control signal PTX_SRQ_H2_V1_2. Thereby, the control signal PTX_H2_V1_2 that is the output signal of the OR gate for output 1507 transitions to the H level. Time t30 is the start timing of a reset period of the photoelectric converters PD of the pixels P belonging to the second row.

Subsequently, at time t31, the control signal PTX_READ_V1_3 for the third pixel row is controlled to the H level. Thereby, in the select circuit 1301(H2, V1, 3), the control signal PTX_H2_V1_3 transitions to the H level and, at the same time, the S-R latch circuit 1505 is set, and the control signal PTX_SRQ_H2_V1_3 transitions to the H level.

Subsequently, at time t32, the control signal PLAT_D transitions to the H level, and thereby the D latch circuit 1506 outputs the H-level control signal PTX_DQ_H2_V1_3 in response to the H-level control signal PTX_SRQ_H2_V1_3. Thereby, the control signal PTX_H2_V1_3 that is the output signal of the OR gate for output 1507 transitions to the H level. Time t32 is the start timing of a reset period of the photoelectric converters PD of the pixels P belonging to the third row.

Next, at time t31, the control signal PTX_SH1_V1_1 for the first pixel row is controlled to the H level. At subsequent time t33, the control signal PTX_SH1_V1_2 for the second pixel row is controlled to the H level. At subsequent time t35, the control signal PTX_SH1_V1_3 for the third pixel row is controlled to the H level. The control signals PTX_SH1_V1_1, PTX_SH1_V1_2, and PTX_SH1_V1_3 correspond to the first shutter operation (SH1).

At timings when the control signals PTX_SH1_V1_1, PTX_SH1_V1_2, and PTX_SH1_V1_3 transition to the H level, the control signals PTHR_SH1_H2 is already at the L level. This indicates that the control signals PTX_SH1_V1_1, PTX_SH1_V1_2, and PTX_SH1_V1_3 are disabled. Thereby, at time t31, the control signal PTX_SH H2_V1_1 remains at the L level. Further, at time t33, the control signal PTX_SH H2_V1_2 remains at the L level. Further, at time t35, the control signal PTX_SH H2_V1_3 remains at the L level.

Subsequently, at time t37, the control signals PTX_SH2_V1_1 for the first pixel row is controlled to the H level. The control signal PTX_SH2_V1_1 corresponds to the second shutter operation (SH2). At the timing when the control signal PTX_SH2_V1_1 transitions to the H level, the control signal PTHR_SH2_H2 is already at the H level. This indicates that the control signal PTX_SH2_V1_1 is enabled. Thereby, at time t38, the control signal PTX_SH H2_V1_1 transitions to the H level. In the select circuit 1301, the S-R latch circuit 1505 is reset, and the control signal PTX_SRQ_H2_V1_1 transitions to the L level.

Subsequently, at time t38, the control signal PLAT_D transitions to the H level, and thereby the D latch circuit 1506 outputs the L-level control signal PTX_DQ_H2_V1_1 in response to the L-level control signal PTX_SRQ_H2_V1_1. Thereby, the control signal PTX_H2_V1_1 that is the output signal of the OR gate for output 1507 transitions to the L level. That is, time t38 is the end timing of the reset period and also the start timing of an exposure period in the photoelectric converters PD of the pixels P belonging to the first row. Note that, since the operation "SH2" is enabled, this exposure period is an exposure period of short-time exposure.

Subsequently, at time t39, the control signals PTX_SH2_V1_2 for the second pixel row is controlled to the H level. The control signal PTX_SH2_V1_2 corresponds to the second shutter operation (SH2). At the timing when the control signal PTX_SH2_V1_2 transitions to the H level, the control signal PTHR_SH2_H2 is already at the H level. This indicates that the control signal PTX_SH2_V1_2 is enabled. Thereby, at time t39, the control signal PTX_SH H2_V1_2 transitions to the H level. In the select circuit 1301, the S-R latch circuit 1505 is reset, and the control signal PTX_SRQ_H2_V1_2 transitions to the L level.

Subsequently, at time t40, the control signal PLAT_D transitions to the H level, and thereby the D latch circuit 1506 outputs the L-level control signal PTX_DQ_H2_V1_2 in response to the L-level control signal PTX_SRQ_H2_V1_2. Thereby, the control signal PTX_H2_V1_2 that is the output signal of the OR gate for output 1507 transitions to the L level. That is, time t40 is the end timing of the reset period and also the start timing of an exposure period in the photoelectric converters PD of the pixels P belonging to the second row. Note that, since the operation "SH2" is enabled, this exposure period is an exposure period of short-time exposure.

Subsequently, at time t41, the control signals PTX_SH2_V1_3 for the third pixel row is controlled to the H level. The control signal PTX_SH2_V1_3 corresponds to the third shutter operation (SH2). At the timing when the control signal PTX_SH2_V1_3 transitions to the H level, the control signal PTHR_SH2_H2 is already at the H level. This indicates that the control signal PTX_SH2_V1_3 is enabled. Thereby, at time t41, the control signal PTX_SH H2_V1_3 transitions to the H level. In the select circuit 1301, the S-R latch circuit 1505 is reset, and the control signal PTX_SRQ_H2_V1_3 transitions to the L level.

Subsequently, at time t42, the control signal PLAT_D transitions to the H level, and thereby the D latch circuit 1506 outputs the L-level control signal PTX_DQ_H2_V1_3 in response to the L-level control signal PTX_SRQ_H2_V1_3. Thereby, the control signal PTX_H2_V1_3 that is the output signal of the OR gate for output 1507 transitions to the L level. That is, time t42 is the end timing of the reset period and also the start timing of an exposure period in the photoelectric converters PD of the pixels P belonging to the third row. Note that, since the operation "SH2" is enabled, this exposure period is an exposure period of short-time exposure.

At subsequent time t49, t50, t51, t52, t53, and t54, the same operations as those at time t27, t28, t29, t30, t31, and t32 are performed. These operations cause the control signals PTX_READ_V1_1, PTX_READ_V1_2, and PTX_READ_V1_3 to transition to the H level, the L level, and the H level in this order, respectively. This operation is a read operation to read out charge accumulated in the photoelectric converter PD. The exposure periods on respective rows end upon the completion of this read operation.

In the present embodiment, in a read operation, the operation to control the control signal PTX to the H level, the L level, and the H level in this order is performed. That is, in the first H level period, charge accumulated in the photoelectric converter PD is transferred to the floating diffusion FD during an exposure period. In the next L level period, readout of a signal based on the potential of the floating diffusion FD is then performed. Then, the control signal PTX is controlled back to the H level to start reset of the photoelectric converter PD. In terms of holding the photoelectric converter PD in a reset state during a period other than an exposure period, while it may be possible to hold the control signal PTX to the H level at the time of readout of accumulated charge, the present embodiment causes the control signal to once transition to the L level at the time of readout of accumulated charge.

The advantage obtained by such driving is obtained when readout of a signal based on reset noise is performed. Here, reset noise means a noise component that is undesirably added when charge accumulated in the photoelectric converter PD are read out to the floating diffusion FD. Thus, in most imaging devices, a signal based on reset noise is acquired in advance, and a signal based on the actual amount of charge accumulated in the photoelectric converter PD is acquired by subtracting the signal based on reset noise from a signal based on charge transferred to the floating diffusion FD in the post-stage circuit. It is therefore desirable that the state of the floating diffusion FD be the same between the time of readout of the signal based on charge transferred to the floating diffusion FD and the time of readout of the signal based on reset noise. Since the control signal PTX is controlled to the L level at the time of readout of the signal based on reset noise, it is desirable to control the control signal PTX to the L level also at the time of readout of the signal based on charge transferred to the floating diffusion FD.

As described above, according to the present embodiment, it is possible to control the control signal PTX to the L level at the time of readout of the actual charge. Therefore, when driving to read out reset noise of the floating diffusion FD as described above is performed, it is possible to read out only the amount of the actual charge accumulated in the photoelectric converter PD after calculating a difference between respective signals by the post-stage circuit.

Sixth Embodiment

Figure 24:
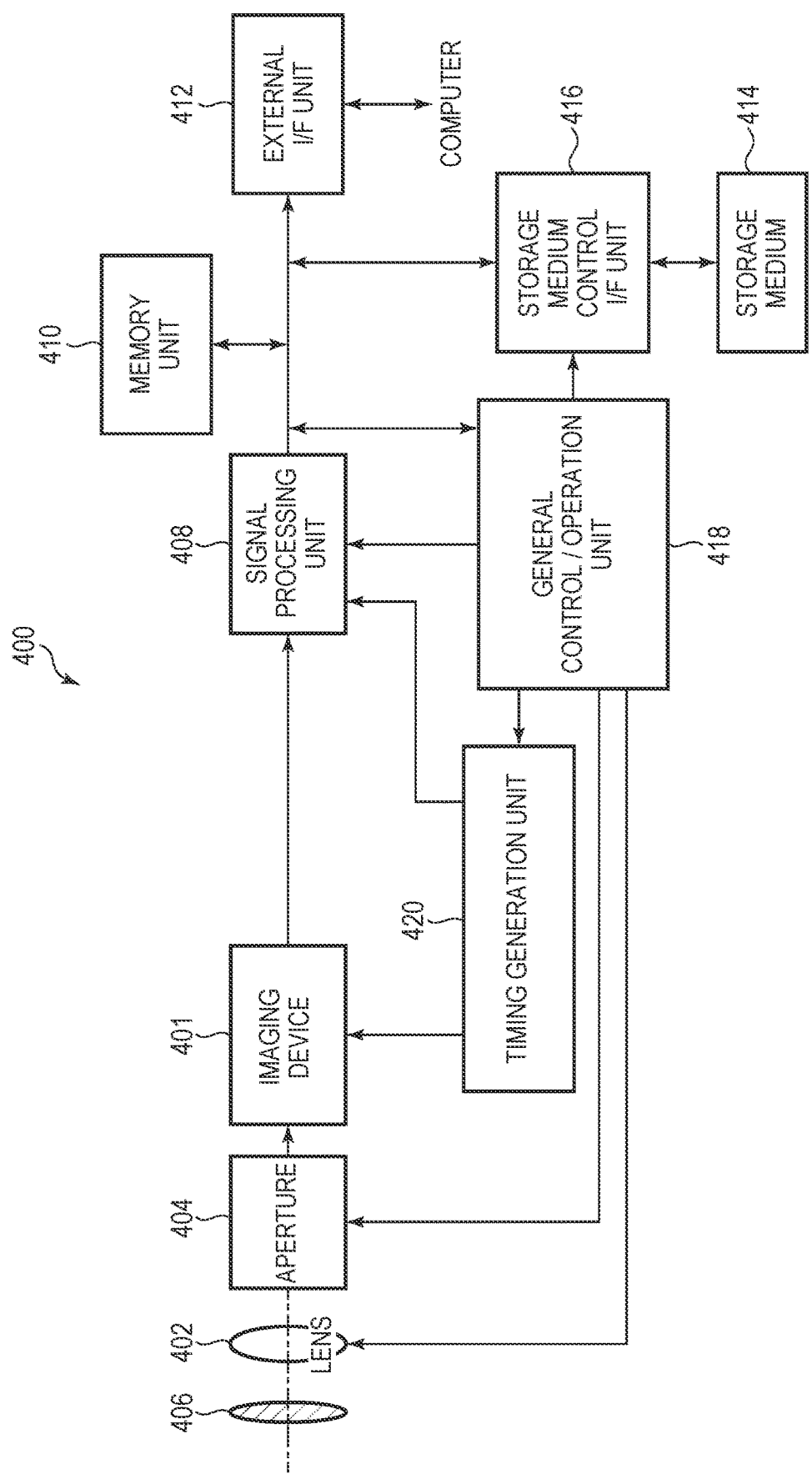
FIG. 24 is a block diagram illustrating a general configuration of an imaging system according to a sixth embodiment of the present invention.

An imaging system according to a sixth embodiment of the present invention will be described with reference to FIG. 24. FIG. 24 is a block diagram illustrating a general configuration of the imaging system according to the present embodiment.

The photoelectric conversion device 100 described in the first to fifth embodiments described above can be applied to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 24 illustrates a block diagram of a digital still camera as an example out of these examples.

An imaging system 400 illustrated as an example in FIG. 24 includes an imaging device 401, a lens 402 that captures an optical image of an object onto the imaging device 401, an aperture 404 for changing a light amount passing through the lens 402, and a barrier 406 for protecting the lens 402. The lens 402 and the aperture 404 form an optical system that converges a light onto the imaging device 401. The imaging device 401 is the photoelectric conversion device 100 described in any of the first to fifth embodiments and converts an optical image captured by the lens 402 into image data.

Further, the imaging system 400 includes a signal processing unit 408 that processes an output signal output from the imaging device 401. The signal processing unit 408 preforms analog-to-digital (AD) conversion that converts an analog signal output from the imaging device 401 into a digital signal. Further, the signal processing unit 408 performs an operation to perform various correction or compression and output image data, if necessary. The AD conversion unit that is a part of the signal processing unit 408 may be formed on a semiconductor substrate on which the imaging device 401 is provided or formed on a semiconductor substrate separately from the imaging device 401. Further, the imaging device 401 and the signal processing unit 408 may be formed on the same semiconductor substrate.

Furthermore, the imaging system 400 includes a memory unit 410 for temporarily storing image data therein and an external interface unit (external I/F unit) 412 for communicating with an external computer or the like. The imaging system 400 further includes a storage medium 414 such as a semiconductor memory for performing storage or readout of imaging data and a storage medium control interface unit (storage medium control I/F unit) 416 for performing storage or readout on the storage medium 414. Note that the storage medium 414 may be embedded in the imaging system 400 or may be removable.

Furthermore, the imaging system 400 includes a general control/operation unit 418 that performs various calculation and controls the entire digital still camera and a timing generation unit 420 that outputs various timing signals to the imaging device 401 and the signal processing unit 408. Here, the timing signal or the like may be input from the outside, and the imaging system 400 may include at least the imaging device 401 and the signal processing unit 408 that processes an output signal output from the imaging device 401.

The imaging device 401 outputs an imaging signal to the signal processing unit 408. The signal processing unit 408 performs predetermined signal processing on an imaging signal output from the imaging device 401 and outputs image data. The signal processing unit 408 uses an imaging signal to generate an image. Further, in the signal processing unit 408, a high dynamic range image may be composed based on signals acquired from the pixels P of the pixel blocks 201 having different lengths of exposure periods.

As described above, according to the present embodiment, the imaging system to which the photoelectric conversion device 100 according to the first to fifth embodiment is applied can be realized.

Seventh Embodiment

Figure 25A:
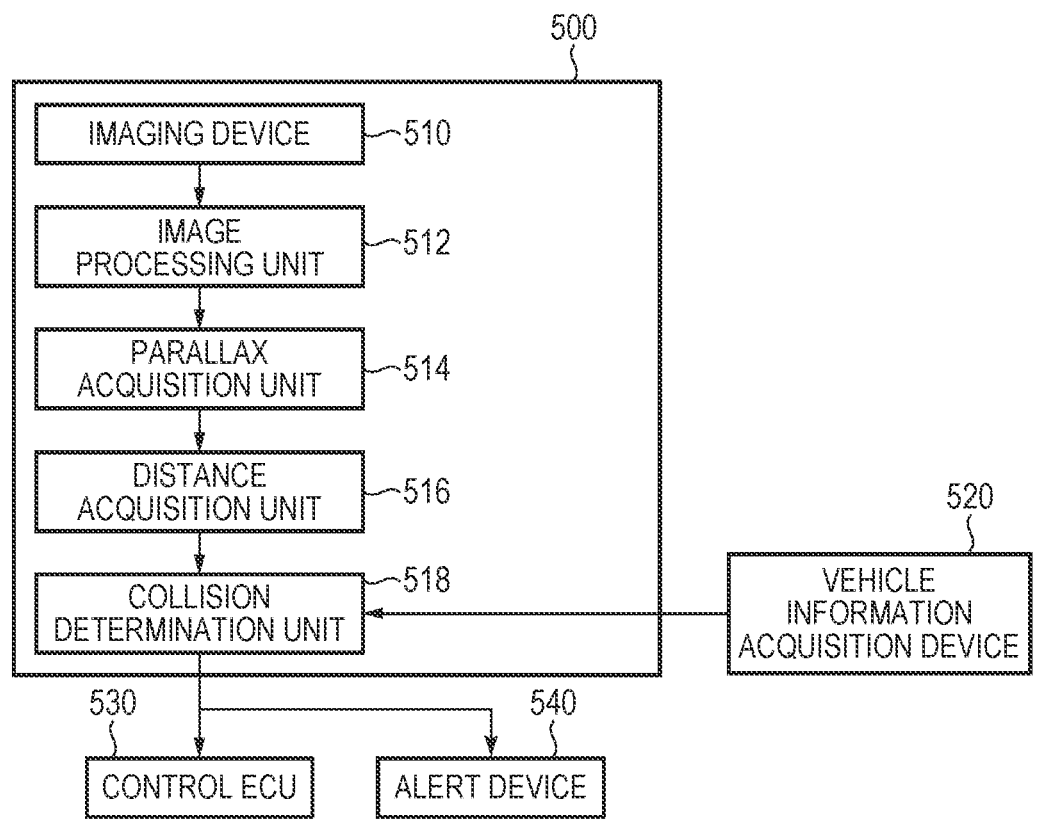
FIG. 25A is a diagram illustrating a configuration example of an imaging system according to a seventh embodiment of the present invention.
Figure 25B:
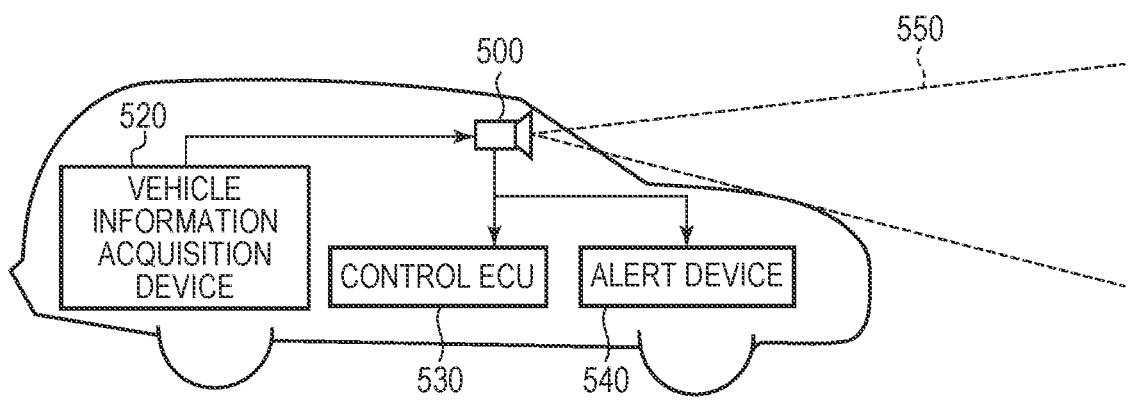
FIG. 25B is a diagram illustrating a configuration example of a movable object according to the seventh embodiment of the present invention.

An imaging system and a movable object according to a seventh embodiment of the present invention will be described by using FIG. 25A and FIG. 25B. FIG. 25A is a diagram illustrating a configuration of the imaging system according to the present embodiment. FIG. 25B is a diagram illustrating a configuration of the movable object according to the present embodiment.

FIG. 25A illustrates an example of an imaging system related to an on-vehicle camera. An imaging system 500 includes an imaging device 510. The imaging device 510 is the photoelectric conversion device 100 described in any of the above first to fifth embodiments. The imaging system 500 includes an image processing unit 512 that performs image processing on a plurality of image data acquired by the imaging device 510 and a parallax acquisition unit 514 that calculates a parallax (a phase difference of parallax images) from the plurality of image data acquired by the imaging system 500. Further, the imaging system 500 includes a distance acquisition unit 516 that calculates a distance to the object based on the calculated parallax and a collision determination unit 518 that determines whether or not there is a collision possibility based on the calculated distance. Here, the parallax acquisition unit 514 and the distance acquisition unit 516 are an example of a distance information acquisition unit that acquires distance information on the distance to the object. That is, the distance information is information on a parallax, a defocus amount, a distance to an object, or the like. The collision determination unit 518 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like or may be implemented by a combination thereof.

The imaging system 500 is connected to the vehicle information acquisition device 520 and can acquire vehicle information such as a vehicle speed, a yaw rate, a steering angle, or the like. Further, the imaging system 500 is connected to a control ECU 530, which is a control device that outputs a control signal for causing a vehicle to generate braking force based on a determination result by the collision determination unit 518. Further, the imaging system 500 is also connected to an alert device 540 that issues an alert to the driver based on a determination result by the collision determination unit 518. For example, when the collision probability is high as the determination result of the collision determination unit 518, the control ECU 530 performs vehicle control to avoid a collision or reduce damage by applying a brake, pushing back an accelerator, suppressing engine power, or the like. The alert device 540 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 500. FIG. 25B illustrates the imaging system when a front area of a vehicle (a capturing area 550) is captured. The vehicle information acquisition device 520 transmits an instruction to the imaging system 500 or the imaging device 510. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present invention.

Further, the select circuit 1301 and the control signal thereof are not limited to the configuration example illustrated in FIG. 15 or FIG. 20 and may be modified appropriately as far as the same advantage as the advantage described in each embodiment may be realized.

Further, the imaging systems illustrated in the above sixth and seventh embodiments are examples of an imaging system to which the photoelectric conversion device of the present invention may be applied, and an imaging system to which the photoelectric conversion device of the present invention can be applied is not limited to the configuration illustrated in FIG. 24 and FIG. 25A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-213989, filed Nov. 14, 2018, which is hereby incorporated by reference herein in its entirety.

What is claimed is:

1. A photoelectric conversion device comprising:
a pixel unit in which a plurality of pixels are arranged to form a plurality of rows and a plurality of columns and each of the plurality of pixels includes a photoelectric converter that generates charge by photoelectric conversion, an output unit including a floating diffusion and configured to output a signal in accordance with a voltage of the floating diffusion, and a transfer transistor that transfers charge in the photoelectric converter to the floating diffusion; and
a pixel control unit that controls operations of the plurality of pixels,
wherein the pixel unit includes a plurality of pixel blocks each including one or more of the pixels,
wherein the pixel control unit includes select circuits respectively associated to the plurality of pixel blocks, each of the select circuits being configured to select a control signal to be supplied to the pixels of a corresponding pixel block,
wherein at least the pixel unit is provided on a first substrate,
wherein at least the select circuits are provided on a second substrate,
wherein the first substrate and the second substrate are stacked on each other,
wherein the pixel control unit is configured to supply, to the pixels of each of the plurality of pixel blocks, a control signal in accordance with an exposure period individually defined for the plurality of pixel blocks,
wherein the pixel control unit is configured to read out, from each of the plurality of pixels, a first signal obtained by resetting the floating diffusion and a second signal based on charge accumulated in the photoelectric converter during the exposure period,
wherein, at a first timing, a signal corresponding to charge accumulated during a first exposure period is read out from a pixel in a first pixel block,
wherein, at a second timing after the first timing, a signal corresponding to charge accumulated during a second exposure period shorter than the first exposure period is read out from a pixel in a second pixel block,
wherein, at a third timing before the first timing, the first exposure period is started by cancelling a reset of the photoelectric converter of the pixel of the first pixel block,
wherein, at a fourth timing between the third timing and the second timing, the second exposure period is started by cancelling a reset of the photoelectric converter of the pixel of the second pixel block,
wherein, at a fifth timing between the third timing and the fourth timing, a third exposure period is started by cancelling a reset of the photoelectric converter of a pixel of a third pixel block, and
wherein a reset of the photoelectric converter of the pixel of the second pixel block is performed in at least a part of a period from the fifth timing to the fourth timing separately from the reset of the photoelectric converter of the pixel of the second pixel block at the fourth timing.

2. The photoelectric conversion device according to claim 1, wherein each of the select circuits includes at least two latch circuits each configured to generate a control signal supplied to the transfer transistor of the pixels belonging to the corresponding pixel block.

3. The photoelectric conversion device according to claim 2, wherein a first latch circuit arranged on a pre-stage out of the two latch circuits included in the select circuits holds a level of an output signal at a High level during a period from a rising edge of a control signal indicating a read timing to a rising edge of a control signal indicating an effective reset timing.

4. The photoelectric conversion device according to claim 3, wherein a second latch circuit arranged on a post-stage out of the at least two latch circuits included in the select circuits holds a level of an output signal at a High level in accordance with an output signal of the first latch circuit and a timing control signal indicating a start timing of the reset period of the photoelectric converter.

5. The photoelectric conversion device according to claim 4, wherein the timing control signal is input commonly to all the select circuits.

6. The photoelectric conversion device according to claim 1, wherein each of a plurality of pixel control lines connecting the pixel control unit and the pixel unit to each other is connected via one connection node at a boundary between the first substrate and the second substrate and connected to a common signal line connecting the plurality of pixels arranged on the same row of the same pixel block on the first substrate.

7. The photoelectric conversion device according to claim 1, wherein a region in which the pixel unit is provided and a region in which the select circuits are provided do not overlap each other in a plan view.

8. The imaging system according to claim 7, wherein the signal processing unit composes a high dynamic range image based on signals acquired from the pixel blocks having different lengths of the exposure period.

9. The photoelectric conversion device according to claim 1, wherein all of lengths of signal lines that supply control signals from the pixel control unit to transfer transistors of the pixels are the same.

10. The photoelectric conversion device according to claim 1, wherein the plurality of pixel blocks are arranged in the pixel unit so as to form a plurality of rows and a plurality of columns.

11. An imaging system comprising:
the photoelectric conversion device according to claim 1; and
a signal processing unit that processes signals output from the pixels of the photoelectric conversion device.

12. A movable object comprising:
the photoelectric conversion device according to claim 1;
a distance information acquisition unit that acquires distance information on a distance to an object, from a parallax image based on signals from the photoelectric conversion device; and
a control unit that controls the movable object based on the distance information.

13. The photoelectric conversion device according to claim 1, wherein the transfer transistor is in an off-state in a period in which the first signal is read out and a period in which the second signal is read out.

14. The photoelectric conversion device according to claim 1,
wherein the plurality of pixels includes a first pixel and a second pixel which are arranged on the same row and belong to the different pixel blocks from each other, and
wherein a start timing of the reset period of the first pixel is different from a start timing of the reset period of the second pixel.

15. The photoelectric conversion device according to claim 14, wherein the start timing of the reset period of the first pixel and the start timing of the reset period of the second pixel are so set that a length of a period from the start timing of the reset period to a start timing of an accumulation period of the first pixel is the same as a length of a period from the start timing of the reset period to a start timing of an accumulation period of the second pixel.

16. The photoelectric conversion device according to claim 1,
wherein the third pixel block includes pixels of a plurality of rows, the plurality of rows is sequentially scanned, and the third exposure period of a pixel that is to be scanned last out of the pixels of the plurality of rows is started by cancelling the reset of the photoelectric converter at a seventh timing, and
wherein the reset of the photoelectric converter of the pixel of the second pixel block is performed in at least a part of a period from the fifth timing to the seventh timing.

17. The photoelectric conversion device according to claim 1, wherein the reset of the photoelectric converter of the pixel of the second pixel block is performed in at least a part of a period from the third timing to the fourth timing.

18. The photoelectric conversion device according to claim 1, wherein, at a sixth timing after the second timing, a signal corresponding to charge accumulated during the third exposure period is read out from the pixel of the third pixel block.

19. The photoelectric conversion device according to claim 1, wherein a length of the first exposure period and a length of the third exposure period is the same.

20. The photoelectric conversion device according to claim 1, wherein the second pixel block is arranged between the first pixel block and the third pixel block.

21. The photoelectric conversion device according to claim 1, wherein, at a sixth timing before the second timing, a signal corresponding to charge accumulated during the third exposure period is read out from the pixel of the third pixel block.

22. The photoelectric conversion device according to claim 21, wherein a length of the second exposure period and a length of the third exposure period is the same.

23. The photoelectric conversion device according to claim 21, wherein the first pixel block is arranged between the third pixel block and the second pixel block.

24. The photoelectric conversion device according to claim 1, wherein a length of a period during which the photoelectric converter of the pixel of the first pixel block is being reset is different from a length of a period during which the photoelectric converter of the pixel of the second pixel block is being reset.

25. The photoelectric conversion device according to claim 24, wherein the length of the period during which the photoelectric converter of the pixel of the first pixel block is being reset is shorter than the length the period during which the photoelectric converter of the pixel of the second pixel block is being reset.

26. The photoelectric conversion device according to claim 1, wherein a length of a period during which the photoelectric converter of the pixel of each of two pixel blocks out of the first pixel block, the second pixel block and the third pixel block is being reset is different from a length of a period during which the photoelectric converter of the pixel of the other pixel block out of the first pixel block, the second pixel block and the third pixel block is being reset.

27. The photoelectric conversion device according to claim 26, wherein a length of a period during which the photoelectric converter of the pixel of the second pixel block is being reset is longer than a length of a period during which the photoelectric converter of the pixel of each of the first pixel block and the third pixel block is being reset.

28. The photoelectric conversion device according to claim 26, wherein a length of a period during which the photoelectric converter of the pixel of the first pixel block is being reset is longer than a length of a period during which the photoelectric converter of the pixel of each of the second pixel block and the third pixel block is being reset.

29. The photoelectric conversion device according to claim 1, wherein the first substrate and the second substrate are stacked on each other so that each of the plurality of pixel blocks on the first substrate overlaps with a corresponding one of the select circuits on the second substrate.

30. A photoelectric conversion device comprising:
a pixel unit in which a plurality of pixels are arranged to form a plurality of rows and a plurality of columns and each of the plurality of pixels includes a photoelectric converter that generates charge by photoelectric conversion, an output unit that outputs a signal in accordance with an amount of charge, and a transfer transistor that transfers charge in the photoelectric converter to the output unit; and
a pixel control unit that controls operations of the plurality of pixels,
wherein the pixel unit includes a plurality of pixel blocks each including one or more of the pixels, wherein the pixel control unit includes select circuits respectively associated to the plurality of pixel blocks, each of the select circuits being configured to select a control signal to be supplied to the pixels of a corresponding pixel block, wherein the pixel control unit is configured to supply, to the pixels of each of the plurality of pixel blocks, a control signal in accordance with an exposure period individually defined for the plurality of pixel blocks, wherein at least the pixel unit is provided on a first substrate, wherein at least the select circuits are provided on a second substrate, wherein the first substrate and the second substrate are stacked on each other so that each of the plurality of pixel blocks on the first substrate overlaps with a corresponding one of the select circuits on the second substrate, wherein a period excluding both the exposure period and a period in which a signal based on charge accumulated in the photoelectric converter during the exposure period is being read out corresponds to a reset period of the photoelectric converter in which the photoelectric converter is being in a reset state, wherein each of the select circuits includes at least two latch circuits each configured to generate a control signal supplied to the transfer transistor of the pixels belonging to the corresponding pixel block, wherein the at least two latch circuit includes a first latch circuit having a plurality of input terminals including a first input terminal and a first output terminal, and a second latch circuit having a plurality of input terminals including a second input terminal connected to the first output terminal and a second output terminal, and wherein a signal of the first output terminal is held based on a signal input to the first input terminal, and a signal of the second output terminal is held based on a signal output to the second input terminal.

31. The photoelectric conversion device according to claim 30, wherein the first latch circuit arranged on a pre-stage out of the at least two latch circuits included in the select circuits holds a level of an output signal at a High level during a period from a rising edge of a control signal indicating a read timing to a rising edge of a control signal indicating an effective reset timing.

32. The photoelectric conversion device according to claim 31, wherein the second latch circuit arranged on a post-stage out of the at least two latch circuit included in the select circuits holds a level of an output signal at a High level in accordance with an output signal of the first latch circuit and a timing control signal indicating a start timing of the reset period of the photoelectric converter.

33. The photoelectric conversion device according to claim 32, wherein the timing control signal is input commonly to all the select circuits.

34. An imaging system comprising:
the photoelectric conversion device according to claim 30; and
a signal processing unit that processes signals output from the pixels of the photoelectric conversion device.

35. The imaging system according to claim 34, wherein the signal processing unit composes a high dynamic range image based on signals acquired from the pixel blocks having different lengths of the exposure period.

36. A movable object comprising:
the photoelectric conversion device according to claim 30;
a distance information acquisition unit that acquires distance information on a distance to an object, from a parallax image based on signals from the photoelectric conversion device; and
a control unit that controls the movable object based on the distance information.

37. The photoelectric conversion device according to claim 30, wherein the photoelectric converter is being the reset state during the period excluding both the exposure period and the period in which the signal based on charge accumulated in the photoelectric converter during the exposure period is being read out.

* * * * *